(12) United States Patent
Sanada et al.

(10) Patent No.: US 7,005,461 B2
(45) Date of Patent: Feb. 28, 2006

(54) AQUEOUS INK, INK JET RECORDING METHOD, INK CARTRIDGE, RECORDING UNIT, AND INK JET RECORDING APPARATUS

(75) Inventors: Mikio Sanada, Kanagawa (JP);
Yoshihisa Takizawa, Tokyo (JP);
Katsuhiko Takahashi, Kanagawa (JP);
Masashi Ogasawara, Tokyo (JP);
Yoichi Takada, Kanagawa (JP);
Tomonari Watanabe, Kanagawa (JP);
Yui Tokuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 10/356,471

(22) Filed: Feb. 3, 2003

(65) Prior Publication Data

US 2003/0195275 A1 Oct. 16, 2003

(30) Foreign Application Priority Data

| Feb. 4, 2002 | (JP) | ............................. 2002/027051 |
| Jul. 1, 2002 | (JP) | ............................. 2002/191641 |
| Feb. 3, 2003 | (JP) | ............................. 2003/025615 |

(51) Int. Cl.
*C09D 11/10* (2006.01)
*C08K 9/04* (2006.01)

(52) U.S. Cl. ...................................... 523/160; 523/205
(58) Field of Classification Search ................ 523/160, 523/161, 200, 205; 106/31.6, 31.89
See application file for complete search history.

(56) References Cited

U.S. PATENT DOCUMENTS

| 5,609,671 | A | 3/1997 | Nagasawa ................. 106/20 R |
| 5,952,429 | A | 9/1999 | Ikeda et al. ............... 525/326.1 |
| 5,976,233 | A | 11/1999 | Osumi et al. ............. 106/31.86 |
| 6,150,433 | A | 11/2000 | Tsang et al. ................. 523/160 |
| 6,153,001 | A * | 11/2000 | Suzuki et al. ............. 106/31.65 |
| 6,221,141 | B1 | 4/2001 | Takada et al. .............. 106/31.6 |
| 6,221,932 | B1 | 4/2001 | Moffatt et al. ............... 523/160 |
| 6,238,045 | B1 | 5/2001 | Ono et al. ..................... 347/96 |
| 6,280,513 | B1 | 8/2001 | Osumi et al. ............... 106/31.6 |
| 6,323,257 | B1 | 11/2001 | Moffatt et al. ............... 523/160 |
| 6,332,919 | B1 | 12/2001 | Osumi et al. ............... 106/31.6 |
| 6,342,095 | B1 | 1/2002 | Takizawa et al. ......... 106/31.27 |
| 6,375,317 | B1 | 4/2002 | Osumi et al. ................ 347/100 |
| 6,425,662 | B1 | 7/2002 | Teraoka et al. ............. 347/100 |
| 6,478,863 | B1 * | 11/2002 | Johnson et al. ............ 106/31.6 |
| 6,511,534 | B1 | 1/2003 | Mishina et al. .......... 106/31.33 |
| 6,699,319 | B1 * | 3/2004 | Adams et al. ............... 106/476 |
| 6,706,104 | B1 * | 3/2004 | Takuhara et al. ........... 106/31.6 |
| 6,723,783 | B1 * | 4/2004 | Palumbo et al. ............ 524/555 |
| 2002/0036677 | A1 | 3/2002 | Watanabe et al. ............. 347/65 |
| 2002/0059883 | A1 | 5/2002 | Takada et al. .............. 106/31.6 |
| 2003/0195291 | A1 * | 10/2003 | Lamprey et al. ............ 524/495 |

FOREIGN PATENT DOCUMENTS

| EP | 0 976 798 A1 | 2/2000 |
| EP | 0 976 799 A1 | 2/2000 |
| JP | 8-3498 A | 1/1996 |
| JP | 9-272831 A | 10/1997 |
| JP | 10-195360 A | 7/1998 |
| JP | P2000-53902 A | 2/2000 |
| JP | P2000-95987 A | 4/2000 |
| WO | WO 99/51690 | 10/1999 |
| WO | WO 01/25340 A1 | 4/2001 |
| WO | WO 01/51566 A1 | 7/2001 |

OTHER PUBLICATIONS

Sperling, L.H.; Introdcuction to Physical Polymer Science 2nd Ed., John Wiley & Sons, New York, 1992 (p. 99).*

* cited by examiner

*Primary Examiner*—Callie Shosho
(74) *Attorney, Agent, or Firm*—Fitzpatrick, Cella, Harper & Scinto

(57) ABSTRACT

The present invention relates to an aqueous ink, particularly an aqueous ink suitable for ink jet recording. The ink is an aqueous ink comprising a modified pigment having organic groups chemically attached to the surface of a particle of the pigment and an aqueous medium which is a dispersant of the pigment, wherein the above-described organic group includes a reaction product of a functional group chemically attached to the surface of the pigment directly or via another atomic group with a copolymer of an ionic monomer and a hydrophobic monomer.

23 Claims, 6 Drawing Sheets

AQUEOUS INK, INK JET RECORDING METHOD, INK CARTRIDGE, RECORDING UNIT, AND INK JET RECORDING APPARATUS

BACKGROUND OF THE INVENTION

1. Field of the Invention

The present invention relates to an aqueous ink, and also relates to a method for ink jet recording, an ink cartridge, a recording unit, and an ink jet recording apparatus.

2. Related Background Art

As a colorant for print ink, pigments having excellent fastness such as water resistance and light resistance have widely been used. Also in ink jet recording ink, use of pigment as a coloring material has been actively studied to improve the fastness of the ink jet print. In order to use a pigment as a coloring material for aqueous ink jet ink, it is important to stably disperse the pigment in an aqueous medium. A dispersant, for example, a resin dispersant, is generally used in order to uniformly disperse the pigment in the aqueous medium. Such a resin dispersant generally comprises a water-soluble resin having a hydrophilic group for stable dispersion of the pigment in the aqueous medium and a hydrophobic portion to physically adsorb onto the hydrophobic surface of the pigment. The quality of images obtained with such pigment ink, for example, rubbing resistance and marker resistance, is relatively good due to the presence of the resin dispersant in the ink.

On the other hand, in order to produce high quality ink jet images stably, it is important to discharge stable ink droplets from fine nozzles of an ink jet recording head. Specifically, it is important for stable ink jet recording that ink does not solidify at the orifice of the ink jet recording head with drying of the orifice. At this point, the above pigment ink jet ink containing a resin dispersant for pigment dispersion has a problem. Since the above-described ink contains a substantial amount of free resin dispersant not adsorbed to the surface of pigment but dissolved in the ink, attachment of such dispersant to the orifice may cause nozzle clogging.

To address the above-described problem, methods for improving reliability of the pigment ink have been proposed. For example, Japanese Patent Application Laid-Open No. 8-3498 or Japanese Patent Application Laid-Open No. 10-195360 discloses an ink using as a coloring material a pigment that can disperse stably in an aqueous ink without using a dispersant (self-dispersing pigment) due to the water soluble groups introduced onto the pigment surface, specifically, of carbon black particles.

However, when printing is carried out with an aqueous ink containing the above-described self-dispersing pigment on a recording medium, particularly, on a plain paper, sometimes the rubbing resistance of the printed image is not sufficient, that is, strong rubbing of the print surface may cause smearing even after sufficient drying of the ink. As described above, dispensing with a resin dispersant in ink may impair certain qualities of an ink jet recording, although it effectively serves to further improve reliability of ink jet recording.

Japanese Patent Application Laid-Open No. 9-272831 discloses an ink-jet ink containing a self-dispersing pigment to which a resin is chemically bonded on the surface, and an ink jet recording process using the ink. It also discloses that the self-dispersing pigment can be obtained by heating a pigment having functional groups and a polymer consisting of segment (A) and segment (B) where segment A as reactive groups reactive with the functional groups on the surface of the pigment and segment (B) has substantially no such reactive groups and has higher affinity for the liquid medium than segment (A) does.

The above-described invention, however, has a problem that the polymer and pigment suitable for use are limited because it is essential for them to have specific functional groups reactive with each other. In addition, according to the study of the inventors of the present invention, it will be difficult in the manufacturing process to impart the ionic property to segment B where groups reactive with the pigment surface are not present. As a result, it is difficult to obtain pigments having sufficient dispersibility in an aqueous medium.

Japanese Patent Application Laid-Open No. 2000-53902 discloses an ink composition for ink jet printing which includes a macromolecule chromophore having at least one functional group for solubility in water and a polymer attached thereto via at least one covalent bond, wherein the polymer is attached to the macrochromophore by nucleophilic substitution or acylation. However, the above invention has problems that usable polymers are limited because they must have an amine or hydroxyl terminal within the polymer; and although rubbing resistance is improved due to dispersion of the functional groups of the terminal modified homopolymer, the marker resistance is insufficient since the polymer on the surface of the pigment is hydrophilic, and is dissolved into water or water-soluble organic solvent of the marker.

Japanese Patent Application Laid-Open No. 2000-95987 also discloses an ink composition for ink jet printing which comprises a macromolecule chromophore (pigment particles) having at least one functional group to give the chromophore solubility in water and at least one polymer attached thereto via a covalent bond, where the polymer is vinyl polymer. To prepare such a composition, radical polymerization of the monomer is conducted in the presence of an initiator and a modified pigment in the step of adding a polymer chain to the surface of the pigment via a covalent bond. According to the study of the present inventors, however, it is difficult to control the molecular size of the polymer in radical polymerization, and it is also difficult to control the acid value or amine value that is an indicator of solubility of the water-soluble polymer in water. In addition, it is not certain that all growing polymers are infallibly bonded to the surface of the pigment via a covalent bond, i.e., terminal radicals of the growing polymers may not necessarily bind to the surface of the pigment to terminate polymerization, but the polymerization reaction may be terminated by binding between growing polymers while part of the growing polymers bind to the surface of the pigment. Therefore, there is a problem in manufacturing the ink composition that it is very difficult to efficiently bind the polymer to the surface of the pigment.

WO 01/51566A1 describes a resin-bonding type self-dispersing pigment using a plurality of molecules. This resin-bonding type self-dispersing pigment allows dispersion of pigment having ionicity. However, the present inventors have found that such use of such a resin-bonding type self-dispersing pigment can secure reliability of the ink with the recording head, but the rubbing resistance or marker resistance of the printed images still has room for improvement.

SUMMARY OF THE INVENTION

Therefore, an object of the present invention is to provide an aqueous ink including a resin-bonding, self-dispersing pigment that can solve certain reliability problems such as twisted discharge or stoppage of discharge due to wetting to maintain ink reliability with the recording head as well as the above-described self-dispersing pigments can, in addition, with which the ability to suppress smear caused by rubbing after printing (hereinafter, referred to as rubbing-smear resistance) is improved and the ability to suppress occurrence of smear when the printed image is overwritten with an aqueous marker, hereinafter referred to as marker-smear resistance) is also improved. Further, an object of the present invention is to provide an ink jet recording method, an ink cartridge, a recording unit, and an ink jet recording apparatus using such an ink.

According to one aspect of the present invention, there is provided an aqueous ink comprising a modified pigment having an organic group chemically attached to the surface of pigment particles and an aqueous medium as a dispersion medium for the pigment, wherein the organic group comprises a reaction product of a functional group chemically attached to the pigment surface directly or via another atomic group and a copolymer of an ionic monomer and a hydrophobic monomer.

Preferable embodiments of the aqueous ink of the invention are as follows. When the above-described ink further contains the above-described copolymer not chemically attached to the surface of the pigment, it is preferable that the proportion by weight (weight fraction) of the free copolymer in the total of free and bonded copolymer is less than 50 wt %, and specifically less than 35 wt %, and more specifically less than 20 wt %.

In an aqueous ink of the above composition, the other atomic group is preferably phenyl(2-sulfoethyl). In an aqueous ink of the above composition, the polydispersity Mw/Mn (Mw: weight average molecular weight, Mn: number average molecular weight) of the copolymer is preferably 3 or less. Also in an aqueous ink of the above composition, the pigment is preferably carbon black. Also in an aqueous ink of the above composition, the weight loss rate of the modified pigment determined by the thermogravimetric analysis (TGA) does not change or does not change substantially before and after washing with a good solvent for the copolymer. In an aqueous ink of the above composition, the copolymer portion has a Mw of 1,000 to 20,000 and its acid value or amine value is 100 to 500. In an aqueous ink of the above composition, the Ka value determined by a Bristow method is less than 1.5 (ml/m$^2$/msec$^{1/2}$) and 0.2 (ml/m$^2$/msec$^{1/2}$) or more. In an aqueous ink of the above composition, the proportion of the organic group of the modified pigment in the total weight of the modified pigment is 5 to 40 wt %, particularly 10 to 25 wt %. In an aqueous ink of the above composition, the proportion of the modified pigment in the total weight of the aqueous ink is 0.1 to 15 wt %, and particularly 1 to 10 wt %. Further, an aqueous ink of the above composition further contains a compound having any of the following Formulae (1) to (5).

R—O—(CH$_2$CH$_2$O)$_n$—H     Formula (1)

wherein, R represents an alkyl group and n represents a positive integer;

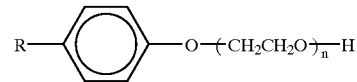

Formula (2)

wherein, R represents an alkyl group and n represents a positive integer;

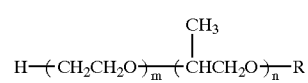

Formula (3)

wherein, R represents a hydrogen group or an alkyl group, m and n represent positive integers independently;

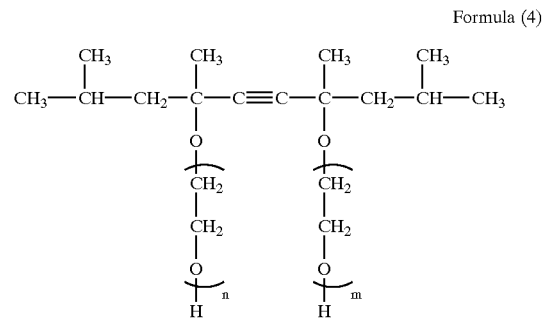

Formula (4)

wherein, m and n represent positive integers independently;

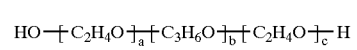

Formula (5)

wherein, a, b, and c represent positive integers independently.

Other embodiments of the present invention include an aqueous ink as described above to be used in ink jet recording, an ink jet recording method that has a step of discharging the above-described aqueous ink jet ink, specifically, an ink jet recording method that discharges the above ink jet ink by the Bubble Jet (registered trademark) method, or by applying mechanical energy to the ink.

Another embodiment of the present invention is an ink cartridge containing the aqueous ink of any composition described above. Another embodiment of the present invention is a recording unit comprising an ink container that contains the above-described aqueous ink jet ink and an ink jet head for discharging the ink. Another embodiment of the present invention is an ink jet recording apparatus comprising an ink container that contains the above-described aqueous ink jet ink and an ink jet head for discharging the ink.

DETAILED DESCRIPTION OF THE INVENTION

Figure 1:
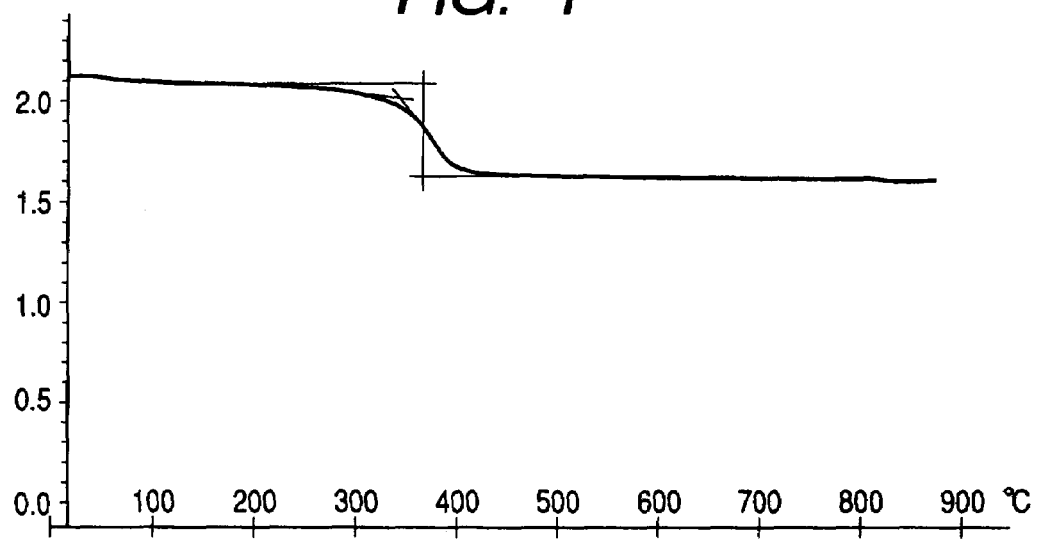
FIG. 1 is a diagram showing a result of a thermogravimetric analysis conducted on a sample of the coagulated pigment of the pigment dispersant 4 used in Example 4.

Next, the present invention is described in detail with reference to preferred embodiments. An aqueous pigment ink according to the present invention comprises a modified pigment having organic groups chemically attached to the surface thereof and an aqueous medium as a dispersion medium for the pigment, where the organic group comprises a functional group existing on or being introduced to the surface of the pigment particle and a copolymer segment attached to the functional group, the copolymer segment being a reaction product of ionic monomers and hydrophobic monomers. Next, materials constituting the aqueous pigment ink of the present invention are described.

[Pigment]

Pigments usable for the aqueous pigment ink according to the present invention are not particularly limited, and the following pigments can be used. Such pigments are modified by a method described later. In the present invention, the proportion of the modified pigment in the total weight of the aqueous ink is preferably 0.1 to 15 wt %, more preferably, 1 to 10 wt %.

Carbon black is suitable as the pigment of black ink. For example, any of furnace black, lampblack, acetylene black, and channel black can be used. Specifically, the following commercially available products can be used: Raven 7000, Raven 5750, Raven 5250, Raven 5000ULTRA, Raven 3500, Raven 2000, Raven 1500, Raven 1250, Raven 1200, Raven 1190ULTRA-II, Raven 1170, Raven 1255 (products of Columbian Chemicals Company); Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, Monarch 2000, Valcan XC-72R (products of Cabot Corporation); Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, Special Black 4 (products of Degussa AG); and No. 25, No. 33, No. 40, No. 47, No. 52, No. 900, No. 2300, MCF-88, MA600, MA7, MA8, MA100 (products of Mitsubishi Chemical Corporation). However, the present invention is not limited to the above-described examples, but any of tho conventional carbon blacks known in the art can be used. Also, carbon black newly and specifically prepared for the present invention can be used. Further, the pigment is not limited to the above-described carbon blacks, but magnetic particulates such as magnetite or ferrite and titanium black may be used as the black pigment.

Examples of the organic pigments usable in the present invention include the following: insoluble azo pigments such as Toluidine Red, Toluidine Maroon, Hansa Yellow, and Benzidine Yellow, and Pyrazolone Red; soluble azo pigments such as Lithol Red, Helio Bordeaux, Pigment Scarlet, and Permanent Red 2B; derivatives from vat dyes such as Allizarine, Indanthron, and Thioindigo Maroon; phthalocyanine pigments such as Phthalocyanine Blue and Phthalocyaine Green; quinacridone pigments such as Quinacridone Red and Quinacridone Magenta; perylene pigments such as Perylene Red and Perylene Scarlet; isoindolinone pigments such as Isoindolinone Yellow and Isoindolione Orange; imidazolone pigments such as Benzimidazolone Yellow, Benzimidazolone Orange and Benzimidazolone Red; Pyranthrone pigments such as Pyranthrone Red and Pyranthrone Orange; thioindigo pigments; condensed azo pigments; diketopyrrolopyrrole pigments; Flavanthrone Yellow; Acylamide Yellow; Quinophtharone Yellow; Nickel Azo Yellow; Copper Azomethine Yellow; Perynone Orange; Anthrone Orange; Dianthraquinonyl Red; Dioxadine Violet, and the like. Needless to say, other organic pigments may be used without limiting to the above.

The organic pigments that can be used in the invention may also be exemplified using color index (C.I.) numbers as follows: C.I. Pigment Yellow 12, 13, 14, 17, 20, 24, 74, 83, 86, 93, 97, 109, 110, 117, 120, 125, 128, 137, 138, 147, 148, 150, 151, 153, 154, 166, 168, 180, and 185; C.I. Pigment Orange 16, 36, 43, 51, 55, 59, 61, and 71; C.I. Pigment Red 9, 48, 49, 52, 53, 57, 97, 122, 123, 149, 168, 175, 176, 177, 180, 192, 215, 216, 217, 220, 223, 224, 226, 227, 228, 238, 240, 254, 255, and 272; C.I. Pigment Violet 19, 23, 29, 30, 37, 40, and 50; C.I. Pigment Blue 15, 15:1, 15:3, 15:4, 15:6, 22, 60, and 64; C.I. Pigment Green 7 and 36; and C.I. Pigment Brown 23, 25, and 26.

[Functional Group]

The pigment in the aqueous ink according to the present invention has a functional group that is chemically attached to the pigment surface directly or via other atomic groups. This functional group is to constitute the organic group through a reaction with a copolymer described below. The type of the functional group is selected according to the functional group of the copolymer. Considering that the modified pigment is dispersed into an aqueous medium, it is preferable that the reaction between the functional group and the copolymer generates a bond not hydrolyzable, such as an amide bond. The copolymer can be introduced to the pigment surface via an amide bond when the above-described functional group is an amino group and the copolymer has a carboxyl group. Also, the copolymer can be introduced to the surface of the pigment particles via the amide bond when the functional group of the pigment is a carboxyl group and the copolymer carries an amino group.

The functional group may be chemically attached to the surface of the pigment directly or via another atomic group. However, when a copolymer having a relatively large molecular weight is introduced to the surface of the pigment, the functional group is preferably introduced to the pigment surface via another atomic group in order to prevent steric hindrance between copolymer molecules. Such an atomic group is not particularly limited as long as the atomic group is a polyvalent element or organic group. However, in view of controlling the distance between the functional group and the pigment surface by the reason described above, a bivalent organic residue is preferably used. Examples of the bivalent organic residue include alkylene and arylene (phenylene) groups.

More specifically, in an example described below, the pigment is reacted with aminophenyl (2-sulfoethyl) sulfone to introduce an aminophenyl(2-sulfoethyl)sulfone group to the pigment surface, then the aminophenyl (2-sulfoethyl) sulfone group is reacted with one of the amino groups of pentaethylene hexamine to introduce the amino group to the pigment as the functional group. In this case, the amino group is chemically attached to the pigment surface via an atomic group containing a phenyl (2-sulfoethyl) group.

[Copolymer]

The copolymer to be used in the present invention comprises ionic monomer units and hydrophobic monomer units, and copolymers having anionic properties (anionic copolymer) and copolymers having cationic properties (cationic copolymer) are used preferably.

Such anionic copolymers include copolymers of hydrophobic monomer units and anionic monomer units and salts thereof. Representative examples of the hydrophobic monomer used herein include, but are not limited to, the following: styrene, vinylnaphthalene, alkyl methacrylate such as methyl methacrylate, phenyl methacrylate, benzyl methacrylate, 2-ethoxyethyl methacrylate, methacrylonitrile, 2-trimethylsiloxyethyl methacrylate, glycidyl methacrylate, p-tolyl methacrylate, sorbyl methacrylate, alkyl acrylate such as methyl acrylate, phenyl acrylate, benzyl acrylate, acrylonitrile, 2-trimethylsiloxyethyl acrylate, glycidyl acrylate, p-tolyl acrylate, sorbyl acrylate.

The anionic monomer to be used in the present invention includes, but is not limited to, acrylic acid, methacrylic acid and maleic acid.

An anionic copolymer made of anionic and hydrophobic monomers, being an example of the copolymer according to the present invention, comprises at least two kinds of monomers, at least one selected from the above-described hydrophobic monomers and at least one selected from the above anionic monomers. This copolymer may be a block copolymer, random copolymer, graft copolymer, or a salt thereof.

The acid value of the anionic copolymer to be used in the present invention is preferably in the range of from 100 to 500, and it is preferable to use those of which the acid value variation is 20% or less of the average acid value. If the acid value is higher than the above-described range, the hydrophilicity at the surface of the pigment is so high that water and the organic solvent in the ink after printing remains on the surface of the pigment, and the development of the marker resistance of the ink is delayed. If the acid value is lower than this range, hydrophilicity at the surface of the pigment is so low that the pigment cannot disperse stably in the ink. Both phenomena can be effectively prevented when the acid value is in this range.

The above-described salt includes alkali metal salts such as sodium, lithium and potassium as well as ammonium salts, alkyl amine salts, and alkanol amine salts. These salts can be used alone, or in appropriate combination thereof.

The weight average molecular weight (Mw) of the above-described anionic copolymer is preferably within the range of from 1,000 to 20,000, and more preferably within a range of from 3,000 to 20,000. The polydispersity Mw/Mn (Mw: weight average molecular weight, Mn: number average molecular weight; Mw/Mn shows the molecular-weight distribution of the copolymer) of the copolymer is preferably 3 or less. The content of the anionic copolymer segment in the surface-modified pigment is preferably 5 wt % or more and 40 wt % or less. More preferably, the content of such a copolymer is 10 wt % or more and 25 wt % or less. When the properties of the copolymer are within the above-described range, both of the prevention of high ink viscosity and the dispersion stability of the pigment can be achieved at a high level.

Next explained is the cationic copolymer made of cationic monomer units and hydrophobic monomer units, being another embodiment of the copolymer according to the present invention. Such cationic copolymers can comprise hydrophobic monomers and cationic monomers selected from the following representative hydrophobic monomers and cationic monomers, but are not limited thereto. Representative hydrophobic monomers are styrene, vinyl naphthalene, alkyl methacrylate such as methyl methacrylate, phenyl methacrylate, benzyl methacrylate, 2-ethoxyethyl methacrylate, methacrylonitrile, 2-trimethylsiloxyethyl methacrylate, glycidyl methacrylate, p-tolyl methacrylate, sorbyl methacrylate, alkyl acrylate such as methyl acrylate, phenyl acrylate, benzyl acrylate, acrylonitrile, 2-trimethylsiloxyethyl acrylate, glycidyl acrylate, p-tolyl acrylate, and sorbyl acrylate.

The cationic monomers are represented by the following monomers, but are not limited thereto in the present invention: allylamine, dimethylaminoethyl methacrylate, diethylaminoethyl methacrylate, tert-butylaminoethyl methacrylate, dimethylaminoethyl acrylate, diethylaminoethyl acrylate, dimethylaminopropylmethacrylamide, N-vinyl carbazole, methacrylamide, acrylamide, and dimethylacrylamide.

The cationic copolymer includes block copolymer, random copolymer, graft copolymer made of at least two kinds of monomers, i.e., a hydrophobic monomer and a cationic monomer selected from the above-described monomers, or a salt thereof.

The amine value of the cationic copolymer to be used in the present invention is preferably in the range of from 100 to 500, and it is preferable to use those of which the amine value variation is 20% or less of the average amine value. The amine value is represented by milligrams of KOH equivalent to the amount of hydrochloric acid required for neutralizing 1 g of the sample. The above-described salt is acetates, hydrochlorides, nitrates and the like. Each of these salts can be used alone, or in appropriate combination thereof.

The weight average molecular weight (Mw) of the above-described cationic copolymer is preferably within the range of 1,000 to 20,000, and more preferably 3,000 to 20,000. A polydispersity Mw/Mn (weight average molecular weight Mw, number average molecular weight Mn) of the cationic copolymer is preferably 3 or less. The content of the cationic copolymer segment in the surface-modified pigment is preferably 5 wt % or more and 40 wt % or less, more preferably 10 wt % or more and 25 wt % or less. When the properties of the copolymer are within the above-described range, both of the prevention of high ink viscosity and the dispersion stability of the pigment can be achieved at a high level.

As for the polydispersity of the copolymer, if the molecular-weight distribution of the copolymer becomes wide, the above-described properties based on the molecular weight of the copolymer are hardly expressed. Thus, the molecular-weight distribution of the copolymer is preferably narrow.

Next, a method for modifying the pigment to have the organic group chemically attached to its surface pigment particle (bonded organic group) is described using carbon black as an example. In the present invention, any method commonly known in the art can be used as long as a functional group present on or introduced to the surface of the pigment particle is bound to a copolymer comprising ionic monomer units and hydrophobic monomer units in order to chemically attach the copolymer to the surface of the pigment particles. For example, the following methods can be used.

One method is to introduce polyethylene imine or the like to the surface of pigment particles such as carbon black, and then chemically attach the terminal functional group to a copolymer of the ionic and hydrophobic monomers having an amino group through the diazonium reaction. Alternatively, a copolymer having an amino group and a carboxyl group within a molecule thereof is chemically attached to the surface of pigment particles such as carbon black through the diazonium reaction. Of other methods for modifying the pigment, the most typical one is disclosed in WO 01/51566A1.

To chemically attach an anionic copolymer to the surface of a carbon black particle, the above-described method includes the following three steps:

The first step; aminophenyl (2-sulfoethyl) sulfone group (APSES) is bonded to carbon black through the diazonium reaction;

The second step: polyethylene imine or pentaethylene hexamine (PEHA) is bonded to the carbon black treated with APSES; and The third step: to the carbon black particle treated above, a copolymer comprised of hydrophobic monomers and ionic monomers having a carboxyl group is bonded.

In the above-described second step, the phenyl (2-sulfoethyl) sulfone group which has been chemically attached to the surface of the carbon black in the first step is reacted with an amino group of polyethylene imine or pentaethylene hexamine (PEHA) for example, so that an amino group is introduced to the surface of the carbon black as a functional group chemically attached to the surface of the carbon black. In the third step, a portion of the carboxyl groups in the ionic monomer segment of the copolymer are reacted with the amino groups in order to form amido bonds, so that the copolymer chains are introduced to the surface of the carbon black via an atomic group comprised of the PEHA residue and the phenyl (2-sulfoethyl) group being a residue of APSES.

In the above-described method, when a cationic copolymer is chemically attached to the surface of the carbon black particle for example, the following two steps are included:

The first step: an aminophenyl (2-sulfoethyl) sulfone group (APSES) is bonded to carbon black through the diazonium reaction, and The second step: a copolymer comprised of hydrophobic monomer units and cationic monomer units is attached to the carbon black treated above. In the above-described first step, a sulfone group is introduced as a functional group chemically attached to the surface of the carbon black. In the second step, for example, a portion of amino groups in the ionic monomer segment of the copolymer is reacted with the sulfone group (nucleophilic substitution), so that the copolymer can be introduced to the surface of the carbon black via an atomic group comprised of a phenyl (2-sulfoethyl) group being a residue of APSES.

[Presence of Free Polymer]

The present invention does not limited to exclude the presence of the above-describe copolymer not chemically attached to the surface of the pigment (hereinafter, referred to as "free polymer", which also includes copolymers physically adsorbed by the surface of the pigment) in the ink. However, it is preferred to control the amount of such free polymer in view of the further improvement of ink jet properties of the aqueous ink of the present invention. Specifically, the amount of the free polymer is less than 50 wt %, preferably less than 35 wt %, and more preferably less than 20 wt % based on the total amount of the free polymer and the organic groups attached to the surface of the pigment.

When an ink rich in the free polymer is used for the ink jet recording, free polymer adheres to the area around the orifice of a recording head to wet the area unevenly, which leads to irregular ink discharge and discharge direction biased from the normal direction. Thus, discharged ink droplets may land on a position shifted away from the intended position. Further, when the printing operation is continuously performed discharging the ink repeatedly from the nozzle, the ink is deposited on the orifice plate near the nozzle. Consequently, a large pool of ink may be formed on the orifice plate starting from the deposited ink near the orifice. It the printing operations are further continued under such conditions, the ink to be discharged may be drawn into the ink pool on the orifice plate, causing a problem called "stoppage of discharge due to wetting".

In view of the ink reliability with a recording head, the amount of the organic group chemically bonded to the surface of the pigment particles (hereinafter referred to as bonded organic group) is preferably not less than 50%, more preferably not less than 65%, and further more preferably, not less than 80% of the total amount of the organic group and the free polymer. This value can be determined by analyzing a dried sample taken out from the ink by the thermogravimetric analysis or the like as described later.

[Aqueous Medium]

Next, described is an aqueous medium for dispersing the above-described modified pigment having bonded organic groups including the above-described copolymer. For example, water or a mixture of water and an aqueous organic solvent can be used for the present invention. Particularly preferred is an aqueous organic solvent that can prevent ink drying effectively.

Specific examples include the following: alkyl alcohols with 1–4 carbons such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or ketoalcohols such as acetone and diacetone alcohol; ethers such as tetrahydrofuran and dioxane; polyalkylene glycols such as polyethylene glycol and polypropylene glycol; alkylene glycols having an alkylene group of 2–6 carbons such as ethylene glycol, propylene glycol, butylene glycol, triethylene glycol, 1,2,6-hexanetriol, thiodiglycol, hexylene glycol, and diethylene glycol; lower alkyl ether acetates such as polyethylene glycol monomethyl ether acetate; glycerin; lower alkyl ethers of polyhydric alcohol, such as ethylene glycol monomethyl (or ethyl) ether, diethylene glycol monomethyl (or ethyl) ether, triethylene glycol monomethyl (or ethyl) ether; and N-methyl-2-pyrrolidone, 2-pyrrolidone, 1,3-dimethyl-2-imidazolidinone, and the like. Such water-soluble organic solvents can be used alone or as a mixture. In addition, deionized water is desirably used as water.

The content of the above-described aqueous organic solvent in the ink according to the present invention is not particularly limited, but is preferably within a range from 3 to 50 wt % of the total amount of the ink. In addition, the content of water in the ink is preferably within a range from 50 to 95 wt % of the total amount of the ink.

For the moisture retention of the ink, other solid humectants such as urea, urea derivatives, trimethylol propane, or trimethylol ethane may be used as a component of the ink. Generally, the content of such a humectant is preferably within a range from 0.1 to 20.0 wt %, and more preferably 3.0 to 10.0 wt % of the ink.

In addition to the above-described components, the ink according to the present invention may also contain various additives such as surfactants, pH adjusters, anticorrosive agents, preservatives, mildewproofing agents, antioxidants, anti-reducers, evaporation accelerators and chelating agents, as required.

[Surfactant]

The surfactant preferably used in the present invention includes those having alkylene oxide chains (ethylene oxide chains, propylene oxide chains or the like). The HLB (Hydrophilic-Lipophilic Balance) value of the surfactant is preferably 10 or more, and particularly 15 or more. Although the addition amount of the surfactant to the ink varies depending on the composition of the ink, not defined particularly, the appropriate amount may be 0.1 to 5 wt %, particularly 0.3 to 1 wt % of the total amount of the ink. When such a surfactant is added to the ink of the present invention, the dispersion stability of the pigment in the aqueous ink is further improved. Further addition of such a surfactant can improve the ink jet ink properties of the aqueous ink such as initial discharge stability and discharge stability over a long period of time. Several examples of the surfactants usable for the present invention are listed below.

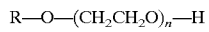                    Formula (1)

R—O—(CH$_2$CH$_2$O)$_n$—H

In the above Formula (1), R is an alkyl group, and specifically a straight- or branched chain alkyl group having at least 6 carbon atoms. n is a positive integer, and preferably not less than 10. More specific examples are polyoxyethylene lauryl ether, polyoxyethylene tridecyl ether, polyoxyethylene cetyl ether, polyoxyethylene stearyl ether, and polyoxyethylene oleyl ether.

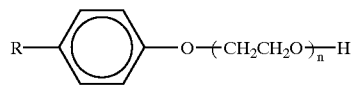

Formula (2)

In the above Formula (2), R is an alkyl group, and specifically a straight- or branched chain alkyl group having at least 6 carbon atoms. n is a positive integer, and preferably not less than 10. Specific examples are polyoxyethylene nonylphenyl ether and polyoxyethylene octylphenyl ether.

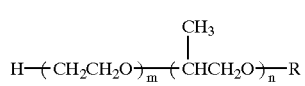

Formula (3)

In the above Formula (3), R is a hydrogen atom or an alkyl group, and specifically an alkyl group having at least 1 to 6 carbon atoms. m and n represent positive integers and preferably m+n is at least 10. The content of ethylene oxide chain within one surfactant molecule of the above Formula (3) is preferably 10 to 80 wt %.

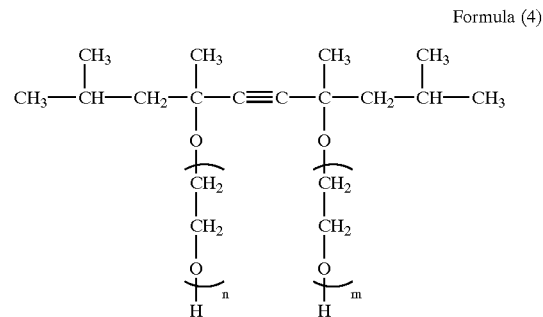

Formula (4)

In the above Formula (4), m and n represent positive integers respectively.

Formula (5)

In the above Formula (5), a, b, and c represent positive integers respectively, and a+b+c is preferably at least 10. The content of ethylene oxide chains within one molecule of surfactant according to the above Formula (5) is preferably 10 to 80 wt %.

As ink-jet recording methods, there are a recording method in which a mechanical energy is applied to the ink to eject an ink droplet and a recording method in which a thermal energy is applied to the ink to eject an ink droplet by the action of a bubble in the ink, for both of which the ink according to the present invention is especially suitable.

When the ink according to the present invention is used for ink-jet recording, the ink should have properties of ejectability from an ink-jet head. From this point of view, the ink has liquid properties such as a viscosity of 1–15 mPa s, and a surface tension of preferably 25 mN/m (dyne/cm) or more, more preferably, 1 to 5 mPa s and 25 to 50 mN/m.

An index indicating the penetrability of ink into a recording medium is the Ka value determined by the Bristow method. Namely, where the penetrability of an ink is expressed by the ink amount V per m$^2$, the penetration amount V (ml/m$^2$=$\mu$m) of the ink to a recording medium after a predetermined time t from the ejection of an ink droplet is expressed by the Bristow equation:

$V = Vr + Ka \, (t-tw)^{1/2}$, where tw is a contact time and Vr is an amount of ink absorbed into the rough portion of the recording medium.

Here, immediately after the landing of an ink droplet to the surface of the recording medium, almost all ink is absorbed in the rough portion of the recording medium (uneven surface portion of the recording medium) and nearly no ink has penetrated inside the recording medium. This period is defined as the contact time (tw) and the amount of ink absorbed in the rough portion during the contact time is defined as Vr. After the contact time, the amount of the ink penetrating into the recording medium increases in proportion to ½ power of the elapsed time exceeding the contact time, i.e., (t−tw). Ka is a proportional coefficient of this increment and corresponds to the penetration speed. The Ka value can be determined by using a test device on dynamic penetrability of liquid by the Bristow method (e.g., Dynamic Penetrability Testing Device S, trade name, a product of TOYO Seiki Mfg., Ltd.).

Furthermore, in the ink according to the embodiment mentioned above, it is preferable to set the Ka value to less than 1.5 ($ml/m^2/msec^{1/2}$), more preferably, from 0.2 ($ml/m^2/msec^{1/2}$) to less than 1.5 ($ml/m^2/msec^{1/2}$), for further improvement of the image quality. When the Ka value is less than 1.5, the solid-liquid separation takes place at an early stage of the ink penetration process into the recording medium, to give high quality images with little feathering. Here, the Ka value by the Bristow the Bristow method in the present invention is determined by using plain paper as the recording medium, such as PB paper (Canon) for copiers employing the electrophotographic process, page printers (laser beam printers), and printers employing the ink-jet recording process, and PPC paper to be used for copiers of the electrophotographic process. The measurement is carried out in presumptive office conditions such as a temperature of from 20 to 25° C. and humidity of from 40 to 60%.

Advantages of the aqueous ink according to the present invention are as follows

A first advantage is that the hydrophilic properties of the modified pigment can be adjusted appropriately by changing the copolymerization ratio between the ionic monomer and the hydrophobic monomer in the copolymer used to modify the pigment, since the modified pigment according to the present invention comprises a reaction product of a functional group chemically attached to the surface of the pigment directly or via another atomic group with a copolymer of an ionic monomer and a hydrophobic monomer. In addition, by changing the types of the ionic monomer and the hydrophobic monomer to be used and a combination thereof, various characteristics can be imparted to the surface of the pigment. Further, when the above-described pigment is made into an ink, ink properties can be controlled by selecting a solvent to be used in combination with such a pigment.

According to the study conducted by the inventors, a second advantage of the aqueous ink of the invention is that the marker-smear resistance of the ink is improved by using a hydrophobic monomer in the copolymer attached to the surface of the pigment. Reasons for the improvement of this marker-smear resistance are considered to be as follows.

If pigment particles, of which the surface is modified with a hydrophilic polymer, arc used in ink, the polymer chains on the pigment particles are entangled after printing on a recording medium to reinforce agglomeration of pigment particles, which improves rubbing-smear resistance (resistance to rubbing friction) of the print after ink fixation. However, if the print surface is rubbed with a water-based marker pen, hydrophilic polymers on the surface of the pigment particles are re-dissolved in water or an aqueous organic solvent contained in the marker ink. Thus the pigment particles disintegrate to flow out when the printing surface is strongly rubbed with a marker pen, making development of marker-smear resistance difficult.

On the other hand, the pigment used for the present invention has an organic group including a copolymer of an ionic monomer and a hydrophobic monomer and chemically attached to the surface of the pigment. The copolymer chains on the surface of the pigment particles are entangled after printing on a recording medium to reinforce agglomeration of pigment particles, which improves rubbing-smear resistance of the print after ink fixation. This is the same as with the ink which uses the above-described pigment of which the surface is modified with a hydrophilic polymer. However, this organic group has a copolymer of an ionic monomer and a hydrophobic monomer. Thus, we think, when water or an organic solvent within the ink dries or penetrates into the recording medium during ink fixation, the polymer chains on the surface of the pigment are not only entangled with each other but the hydrophobic portions of the copolymer chains are oriented outward on the outermost surface of the printing. Therefore, since the outermost surface of the printing becomes hydrophobic, when the printing surface is rubbed with a water-based marker pen, the copolymer on the pigment particles is unlikely to re-dissolve into water or an organic solvent within the marker ink, preventing the pigment particles from flowing out when rubbed with a marker pen.

[Analytical Method]

An analytical method and an evaluation method used for evaluating the properties of the ink according to the present invention is described with reference to an aqueous pigment ink using carbon black as the pigment for example. However, the pigment for the ink according to the present invention is not particularly limited thereto. Also a method for analyzing the surface of the pigment particles modified according to the present invention is not particularly limited, but any proper methods can be used for conducting such analysis. For example, the bonding state of the organic groups existing on the surface of the pigment particles (e.g., carbon black) can be analyzed preferably by using ESCA or TOF-SIMS.

Also, the method for measuring the amount of the bonded organic group of carbon black particles is not particularly limited, but one can use the following method. First, solid matter including the carbon black of which the surface is modified with the organic group can be separated by salting-out or coagulation from the ink containing the modified carbon black. The surface-modified carbon black can be highly purified from the separated solid matter by rinsing the solid matter with a good solvent for the copolymer chemically attached to the surface of carbon black particles and drying the particles. Described below are a more detailed method for isolation of the surface-modified carbon black from the ink, a method for determining the amount of the organic group attached to the surface-modified carbon black particles using a purified and dried sample of modified carbon black, and a method for measuring the amount of the copolymer portion which may be present free in the ink.

Prior to analysis, test samples are prepared from the ink by the following pretreatment steps of: (1) salting-out or coagulating the solid matter from the ink; (2) rinsing the precipitate; (3) evaporating to dryness the precipitate; (4) purifying surface-modified carbon black; and (5) drying the purified modified carbon black.

(1) Methods for salting-out or coagulating the solid containing the surface-modified carbon black from the ink are not particularly limited, but may be, for example, (a) salting-out with a salt such as sodium chloride or potassium chloride or (b) coagulation (acid precipitation) with an acid such as nitric acid or hydrochloric acid. In this case, if necessary, ultrafiltration may be performed as a pre-treatment.

(2) The solid matter obtained by the above-described salting-out or coagulation step is sufficiently washed with pure water. In particular, when coagulation was performed as described in (1) (b), it is preferable that the solid matter is sufficiently washed until the filtrate becomes neutral.

(3) The solid matter after washing is then sufficiently dried in an oven or the like to obtain dried matter. Drying conditions in this case are not particularly limited, but for example, the solid matter may be dried for 2 hours at 60° C.

(4) The dried solid matter obtained in step (3) may contain free copolymer and copolymer physically adsorbed to the carbon black in addition to the carbon black particles having bonded organic groups. Thus, the dried solid matter is washed with a good solvent of the copolymer to obtain the surface-modified carbon black of high purity. The good solvent of the free copolymer depends on the structure of the copolymer, and is not particularly limited. However, tetrahydrofuran (THF) is one of the good, versatile solvents. In this case, it is preferable that the dried solid matter is repeatedly washed with such a good solvent, in order to repeatedly remove free copolymer that may be contained in the solid matter.

(5) Finally, the solid matter from which the free copolymer has been removed by washing with a good solvent of the copolymer as described above is fully dried in an oven or the like to evaporate residual water or solvent from the solid matter. Thus a dried test sample is obtained. The ovens or the like used for drying as described above are not particularly limited, but for example, a commercially available vacuum dryer can be used. In addition, the drying conditions are not particularly limited as long as the remaining water or solvent can be sufficiently removed from the surface-modified carbon black. For example, the solid matter may be dried at 60° C. for three hours under vacuum of several hundreds Pa or lower.

By using the purified surface-modified carbon black obtained through the above-described steps (1) to (5) as a test sample, the amount of the bonded organic groups can be quantitatively determined by thermogravimetric analysis observing change in the weight of the sample. Consequently, the content of the bonded organic group can be measured on the basis of the weight of the surface-modified carbon black particles.

Using the dried solid matter obtained by the above steps (1) to (3) as a test sample, the amount of solid matter excluding the pigment itself, that is a total of bonded organic groups and free copolymer, can be determined by thermogravimetric analysis observing the weight change of the sample.

Consequently, the proportion of the attached organic groups in the total of the attached organic groups and the free polymer contained in the ink can be determined. If a second polymer other than the above-described copolymer is added in the ink, it is preferable to know only the amount of the free polymer in order to exactly calculate the portion of the organic groups in the sum of the organic groups and the free polymer. In such a case, the solvent used to wash the solid matter in the above step (4) is analyzed by liquid chromatography etc. to determine the sole amount of the free polymer.

As described above, a dried sample of purified surface-modified carbon black can be obtained by the steps of: (1) salting-out or coagulation, (2) washing of precipitate, (3) evaporation to dryness, (4) purification of the surface-modified carbon black and (5) drying. The method for determining the content of the bound organic group in the purified and dried sample of the surface-modified carbon black is not particularly limited. For example, such a sample is subjected to a thermogravimetric analysis or the like, and the weight loss rate obtained by the thermogravimetric analysis can be used for easily determining the content of the attached organic groups. Herein below, thermogravimetric analysis in this case is described in detail.

The weight loss rate measured by the thermogravimetric analysis corresponds to the content of the organic groups introduced to the surface of the carbon black particles in the surface-modified carbon black. Such a weight loss rate obtained by the thermogravimetric analysis is given by the following equation, that is, the proportion of the weight loss in the thermogravimetric analysis in the initial weight of the dried sample, where the thermogravimetric analysis is carried out elevating the temperature from 100 to 700° C., and the dried sample is prepared by washing with a good solvent for the copolymer to obtain only the surface-modified carbon black, and the weight loss is due to desorption or combustion of the organic groups attached to the carbon black particles in the thermogravimetric analysis.

Weight loss rate in the thermogravimetric analysis= $A/B \times 100 (\%)$ $A$=weight loss of the sample when the temperature is elevated from 100 to 700° C. in the thermogravimetric analysis;

$B$=initial weight of the sample before the thermogravimetric analysis

Analytical conditions for conducting the above-described thermogravimetric analysis are not particularly limited, and ordinary conditions can be used for pre-treatments and temperature rise. As for the measuring apparatus, a TGA thermogravimetric apparatus, TGA851e/SDTA, manufactured by METTLER TOLEDO can be used for example.

Further, by using the above thermogravimetric analysis, one can know the binding state of the substance used for modifying the pigment to the surface of the pigment such as carbon black. For example, to the surface of carbon black particles, a pigment used in the present invention, organic groups are chemically attached. Thus, the organic groups on the surface of the carbon black particles are not washed away even when washed with a good solvent for the above-described copolymer, but stably attached to the surface of the carbon black particles. Consequently, the weight loss rate in TGA is almost constant whether solvent washing is carried out or not. On the contrary, in the case of a resin dispersion type pigment commonly used, the water-soluble resin used as a dispersant is not chemically attached to the pigment (carbon black). Therefore, when the pigment is washed with a good solvent of the resin used for dispersion, the resin is washed away. Consequently, the weight loss rate in TGA varies greatly with or without the extraction treatment of the sample.

Accordingly, a modified pigment preferably used for the present invention is a pigment whose weight loss rate in TGA would not change or not substantially change before and after the extraction treatment of the sample.

In this case, "whose weight loss rate in TGA would not substantially change before and after extraction treatment" means a difference of the weight loss rate before and after the washing with a good solvent is within 5% for example.

In addition to the above-described thermogravimetric analysis, there are some other methods for observing a bonding state with substances used for the surface modification on the surface of the pigment particle. For example, a surface-modified carbon black used for the present invention is subjected to a salting-out or coagulation treatment to be evaporated to dryness for obtaining a dried carbon black as described above, and the dried carbon black is used as a test sample. Then the test sample is preferably analyzed by a combination of TG-GC-MS (Thermogravimetric Analysis-Gas Chromatography-Mass Spectrum), TOF-MS (Time-of-Flight Mass Spectrometer), and TOF-SIMS (Time-of-Flight Secondary Mass Spectrometry). According to these methods, a bonding state of the substance used for the surface modification of the dried carbon black sample (measurement of adsorption energy), and further, composition, molecular weight distribution, and bonding unit of the organic group attached to the carbon black in the dried carbon black sample can be specifically determined. Examples of the specific apparatus which can be used for the above-described analysis are shown below.

TG-DTA: ThermoPlus TG8120 (manufactured by Rigaku Corporation)

GC: HP6890 (manufactured by Hewlett-Packard Company)

MS: JMS-AMII (manufactured by JAPAN ELECTRON OPTICS LABORATORY)

TOF-MS: Shimadzu MALDI-TOFMSAXIMA-CFR (manufactured by Shimadzu Corporation)

TOF-SIMS: PHITRFYII (manufactured by ULVAC-PHI, INCORPORATED)

The aqueous pigment ink according to the present invention having the above-described constitutions are particularly effective in performing the ink jet recording. As the ink jet recording methods, there are various methods as follows: a recording method in which mechanical energy is applied to the ink, and then droplets of the ink are discharged; and an ink jet recording method in which thermal energy is applied to the ink to produce bubbling thereof, and then droplets of the ink are discharged. The aqueous pigment ink according to the present invention is particularly suited for these ink jet recording methods.

Figure 5:
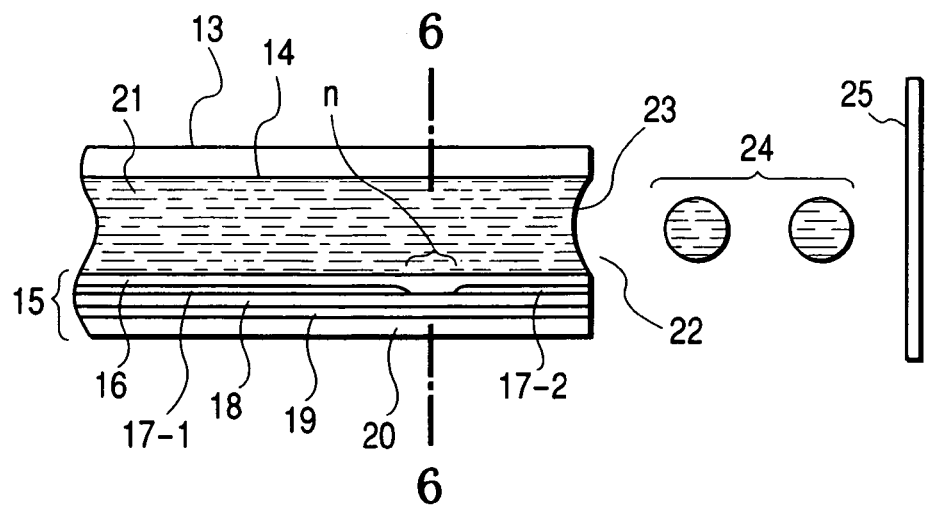
FIG. 5 is a longitudinal section of a head of an ink jet recording apparatus.
Figure 6:
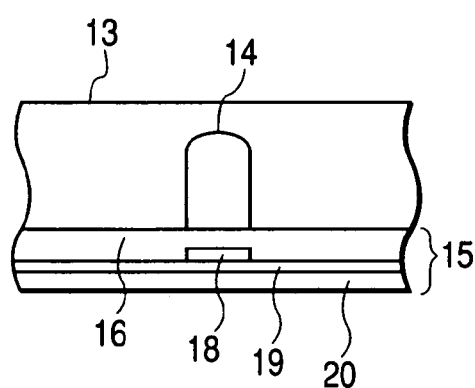
FIG. 6 is a lateral cross section of the head of the ink jet recording apparatus.

Next described is an example of an ink jet recording apparatus according to the present invention, which can preferably be used for recording by using the above-described aqueous pigment ink of the present invention. FIG. 5 and FIG. 6 show an example of a head utilizing thermal energy, which is a main component of an ink jet recording apparatus. FIG. 5 is a cross sectional view of a head 13 taken along an ink channel, and FIG. 6 is a sectional view of the head 13 taken along a line 6—6 in FIG. 5. The head 13 is obtained by bonding a heater element substrate 15 to a plate such as glass, ceramic, silicon, or plastic having a nozzle 14 through which the ink passes. The heater element substrate 15 comprises a protective layer 16 made of silicon oxides, silicon nitrides, silicon carbides or the like, electrodes 17-1 and 17-2 made of aluminum, gold, aluminum-copper alloys or the like, a heat-generating resistor layer 18 made of a high-meting point material such as $HfB_2$, TaN, TaAl or the like, a thermal storage layer 19 made of thermally oxidized silicon, aluminum oxide or the like, and a substrate 20 made of a heat radiative material such as silicon, aluminum, aluminum nitride or the like.

Figure 7:
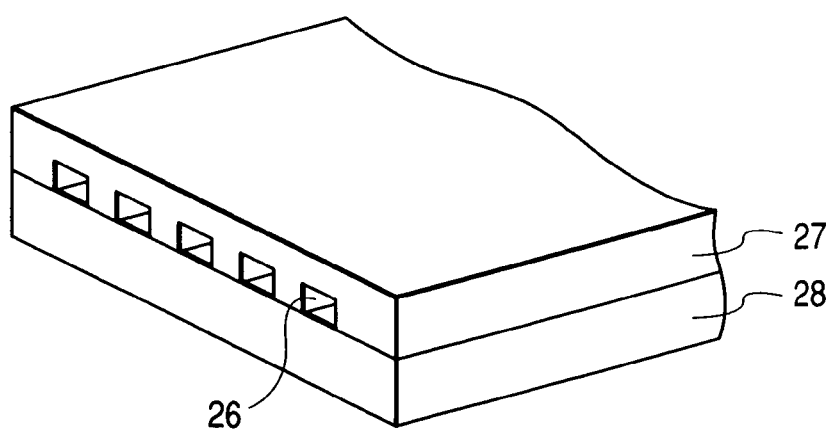
FIG. 7 is a perspective outside view of a head comprising several nozzles like that shown in FIG. 1.

When a pulse-shaped electric signal is applied the electrodes 17-1 and 17-2 of the above head 13, the region (heater) designated with n of the substrate with the heat-generating element 15 rapidly develops a heat, bubbles are generated in the ink 21 contacting this surface, ink 21 comes to a discharge orifice 22 and forms a meniscus 23, the meniscus 23 protrudes, the ink 21 is ejected through a nozzle 14 of the head 13 to form an ink droplet 24 which flies toward a recording medium 25. FIG. 7 shows the outer appearance of one example of multi-head in which many heads shown in FIG. 5 are arranged. This multi-head is formed by stacking glass plate 27 provided with a multi-nozzle 26 and a heat-generating head 28 similar to the one described in FIG. 5.

Figure 8:
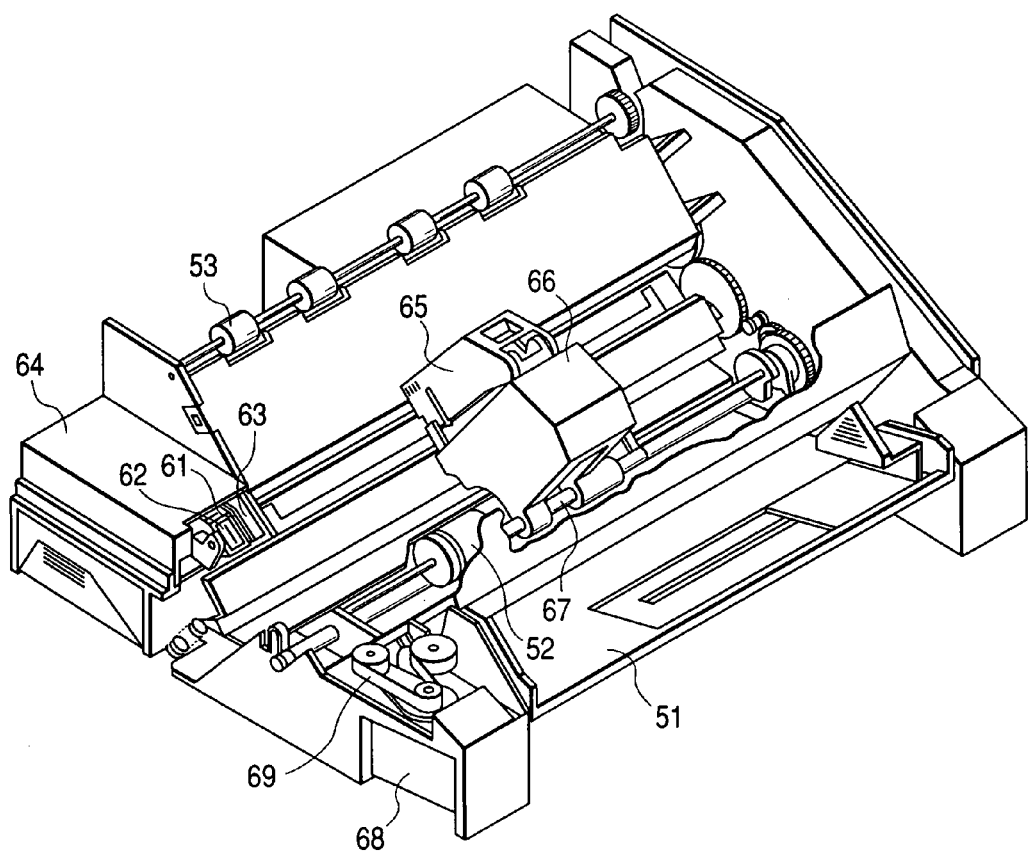
FIG. 8 is a perspective view showing an example of an ink jet recording apparatus.

FIG. 8 shows one example of the ink-jet recording apparatus in which such a head is incorporated. In FIG. 8, reference numeral 61 denotes a blade as a wiping member which is supported with and fixed to a blade-supporting member at one end and has a cantilever-like shape. The blade 61 is arranged in a position adjacent to the recording region of a recording head 65. In this example, the blade is held in a projecting form in the path along which the recording head 65 moves.

Reference numeral 62 denotes a cap for a ejection opening of the recording head 65, the cap is arranged in a home position adjacent to the blade 61 and to move in the direction perpendicular to the moving direction of the recording head 65 so as to cap the ink-ejecting opening when touching it. Numeral 63 denotes an ink-absorber provided adjacent to the blade 61, which is held in the moving path of the recording head 65 in a projecting form like the blade 61. The above blade 61, cap 62 and ink-absorber 63 constitute an ejection recovery portion 64, and the blade 61 and the ink-absorber 63 serve to remove moisture and dust on the ink-ejecting opening.

Reference numeral 65 denotes a recording head. The head contains a means for generating ink-ejecting energy and performs recording by ejecting ink towards a recording medium opposite to the ink-ejecting opening. Numeral 66 denotes a carriage for carrying the recording head 65 so that it can move. The carriage 66 is engaged with a guide shaft 67 in a slidable manner, and a part of the carriage 66 is connected to a belt 69 driven by a motor 68. Thus the carriage 66 can move along the guide shaft 67, and the recording head 65 can move in the recording region and the region adjacent thereto.

Reference numeral 51 denotes a paper feeding portion for inserting a recording medium and numeral 52 denotes a paper-delivery roller driven by a motor not shown in the figure. With such an arrangement, the recording medium is fed to the position opposite to the ink ejecting opening of the recording head 65 and conveyed to a paper output portion provided with a paper output roller 53 as recording proceeds. In the above arrangement, while the recording head returns to its home position after recording, the cap 62 of the ejection recovery portion 64 evacuates from the moving path of the recording head, but the blade 61 is projecting in the moving path. As a result, the ink discharge opening of the recording head 65 is wiped.

The cap 62 moves into the moving path of the recording head 65 in a projecting manner to touch the discharge opening of the head 65 for capping. While the recording head 65 is moving from its home position to recording start position, the cap 62 and the blade 61 take the same position as when wiping is carried out. As a result, the discharge opening of the head 65 is wiped even during this movement. The recording head not only returns to its home position not only after completion of recording and during discharge recovery, but also returns to the home position adjacent to the recording region during moving in the recording region for recording, at prescribed intervals. With this movement, the above wiping is also carried out.

Figure 9:
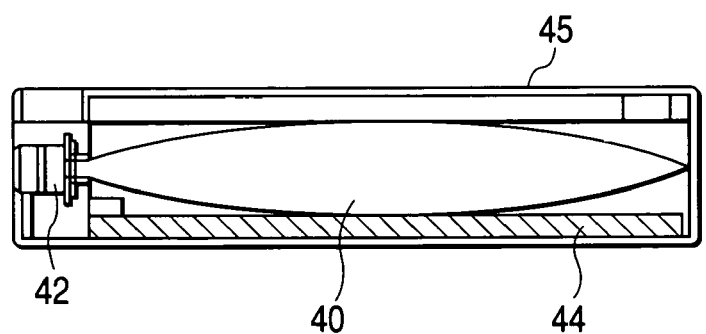
FIG. 9 is a longitudinal section of an ink cartridge.

FIG. 9 shows one example of an ink cartridge for storing ink for feeding ink to the recording head through an ink feeding member, such as a tube. In the drawing, reference numeral 40 denotes a member constituting the ink cartridge 45, an ink storage portion such as an ink bag, whose tip isequipped with a rubber stopper 42. The ink in the ink bag 40 can be fed to the recording head by inserting a needle (not shown in the figure) into the stopper 42. Numeral 44 denotes an ink absorber for receiving waste ink. For the ink storage portion, its surface in contact with ink is preferably made of polyolefin, particularly polyethylene.

Figure 10:
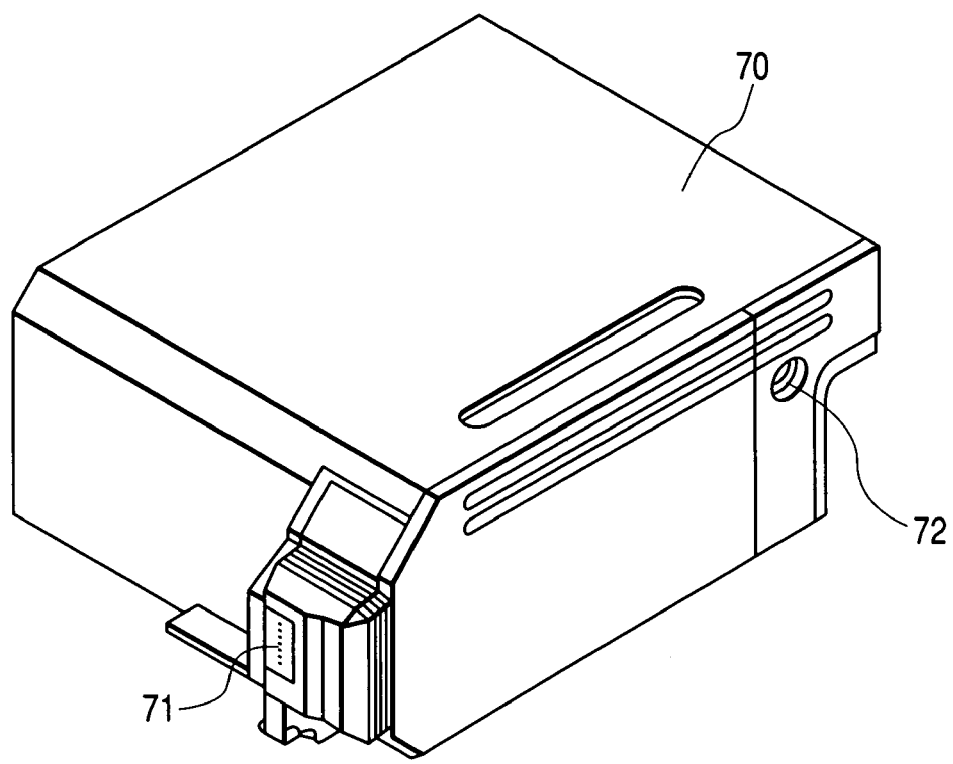
FIG. 10 is a perspective view showing an example of a recording unit.

The ink-jet recording apparatus for use in the present invention is not limited to the aforementioned type in which an ink cartridge is not furnished as an integral part of the head. As shown in FIG. 10, a type in which the above two are integrated into one part is also preferably used. In FIG. 6, reference numeral 70 denotes a recording unit which contains an ink storage portion for storing ink, for example, an ink absorber. In the arrangement of the above unit, ink in the ink absorber is discharged as an ink droplet from a head portion 71 having multiple orifices in it. As a material for the ink absorber, polyurethane is preferably used in the present invention. An integral constitution in which no ink absorber is used and the ink storage portion is an ink bag having a spring within it may be used. Numeral 72 denotes an opening for connecting the inside of the cartridge with air. This recording unit 70 is used in place of the recording head 65 shown in FIG. 8 and detachably attached to the carriage 66.

As another embodiment, there is an on-demand ink-jet recording head, comprising a nozzle forming substrate with multiple nozzles, a pressure generating element made of a piezoelectric material and a conductive material disposed opposite the nozzle and ink filling around this pressure generating element, for displacing the pressure generating element by an applied voltage and discharging ink droplets from the nozzle. One exemplary configuration of such a recording head as the main part of the recording apparatus is shown in FIG. 11.

The head is constituted of: ink flow path 80 leading to the ink chamber (not shown); orifice plate 81 to discharge an ink droplet of the desired volume; vibration plate 82 which applies a pressure directly to the ink; piezoelectric element 83 which is connected with the vibration plate 82 and deforms by the electric signals; and base plate 84 to hold and fix the orifice plate 81, the vibration plate 82, etc.

Figure 11:
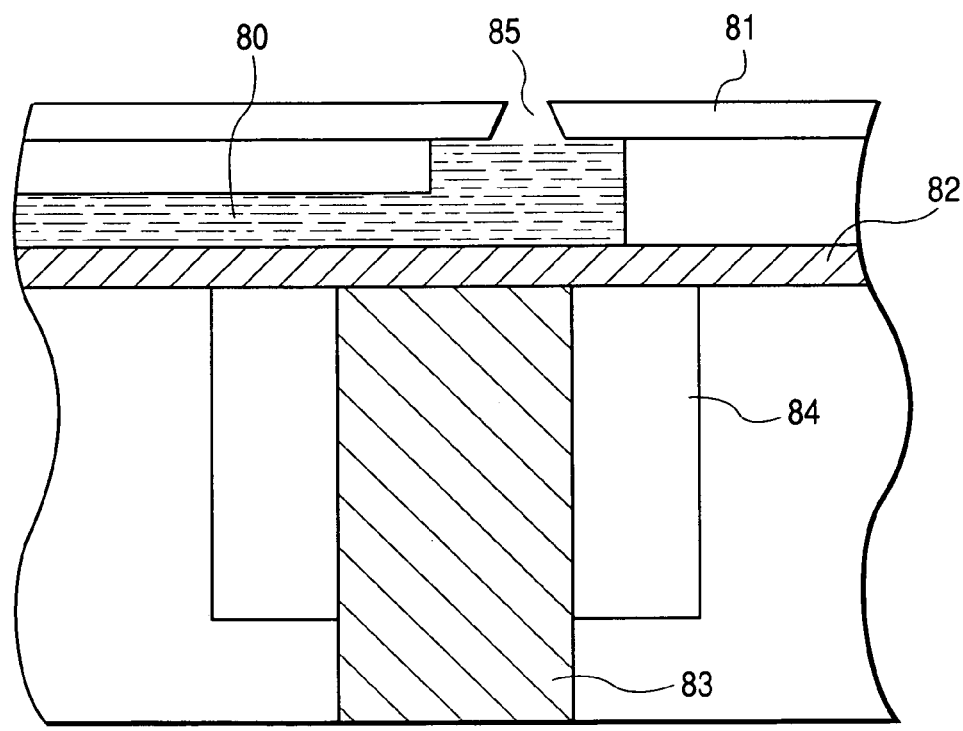
FIG. 11 is a diagram showing an example of a constitution of a recording head.

In FIG. 11, the ink flow path 80 is made from a photosensitive resin; the orifice plate 81 which is made of a metal such as stainless steel and nickel; the discharge orifice 85 which is formed by making a hole in the orifice plate 81 by electrocasting or press processing; the vibration plate 82 which is made from a metal film such as stainless steel, nickel and titanium and a highly elastic resin film; and the piezoelectric element 83 which is made from a dielectric material such as barium titanate and PZT. The recording head of the above constitution works as follows: when a pulse-like voltage is given to the piezoelectric element 83, a strain stress is generated, of which energy deforms the vibration plate connected with the piezoelectric element 83 to apply pressure vertically to the ink in the ink flow path 80, and an ink droplet (not shown) is discharged from the orifice 85 of the orifice plate 81 to perform recording. Such a recording head is incorporated into the recording apparatus similar to the one shown in FIG. 8. Detailed action of the parts of the recording apparatus may be the same as mentioned above.

EXAMPLES

Next, the present invention will be described more specifically with reference to Examples and Comparative Examples, but the present invention is not limited to the following Examples as long as the present invention does riot deviate from its gist. Hereinafter, "part (s)" and "%" are based on weight unless otherwise stated.

Into a reactor, 500 g of carbon black whose specific surface area is 220 g/m$^2$ and DBP oil absorption is 112 ml/100 g, 45 g of aminophenyl (2-sulfoethyl) sulfone (APSES), and 900 g of distilled water were charged, and then stirred for 20 minutes at 300 rpm at 55° C. Then, 40 g of 25%. sodium nitrite was added thereto dropwise over 15 minutes, and further, 50 g of distilled water was added thereto. Reaction was carried out for two hours at 60° C. Then, the resultant reaction product was taken out by diluting it with distilled water, and the solid content was adjusted to 15%. Next, the product was subjected to centrifugation and purification for eliminating impurities. The dispersion thus prepared is a dispersion of carbon black particles having the functional group of APSES attached to the surface thereof (Dispersion A1).

Next, to determine the molar quantity of the functional group attached to the carbon black in the dispersion A1, Na ions in the dispersion were measured by using a probe type sodium electrode, and the obtained value was converted on the basis of the carbon black powder. Next, the dispersion A1 prepared above of which solid content was 15% was added dropwise to a solution of pentaethylene hexamine (PEHA) over 1 hour with vigorous stirring keeping the PEHA solution at room temperature. The PEHA concentration of the starting PEHA solution was adjusted to 2 to 3 times as much as the molar quantity of Na ion determined above, and the same volume of the PEHA solution as that of the dispersion A1 was used. This mixture was further stirred for 48 hours and then subjected to a purification treatment for removing impurities. Finally, a dispersion of a PEHA-bound solid matter at a solid content of 10% was obtained. This dispersion is referred to as dispersion B1.

Next, an aqueous solution of a styrene-acrylic copolymer was prepared as follows. First, 190 g of styrene-acrylic resin of which weight-average molecular weight was 15,000, acid value 140, and polydispersity Mw/Mn 1.5 was weighed, to which 1800 g of distilled water was added and then NaOH was added to neutralize the resin. This mixture was stirred to dissolve these substances to obtain an aqueous solution of styrene-acrylic resin.

Then, 500 g of the previously prepared dispersion B1 of 10% solid content was added dropwise to the above-described aqueous solution of styrene-acrylic resin. Next, the mixture of B1 and the aqueous solution of styrene-acrylic resin was transferred to a Pyrex (registered trademark) evaporating dish, and heated at 150° C. for 15 hours for evaporation, then the evaporated and dried mixture was cooled to room temperature.

Next, this dried mixture was dispersed into an NaOH-containing distilled water (adjusted to pH 9.0) by using a dispersing device, and 1.0M NaOH was further added thereto with stirring to adjust the pH to the range between 10 and 11. After desalting, purifying, and removing coarse particles, a pigment dispersion 1 was obtained. Physical properties of the pigment dispersion 1 thus obtained were as follows: solid content: 10%, pH: 10.1, and an average particle size: 130 nm. The synthesis scheme of the modified pigment having bonded organic groups, i.e., modified carbon black particles contained in the above-described pigment dispersion 1, is shown below.

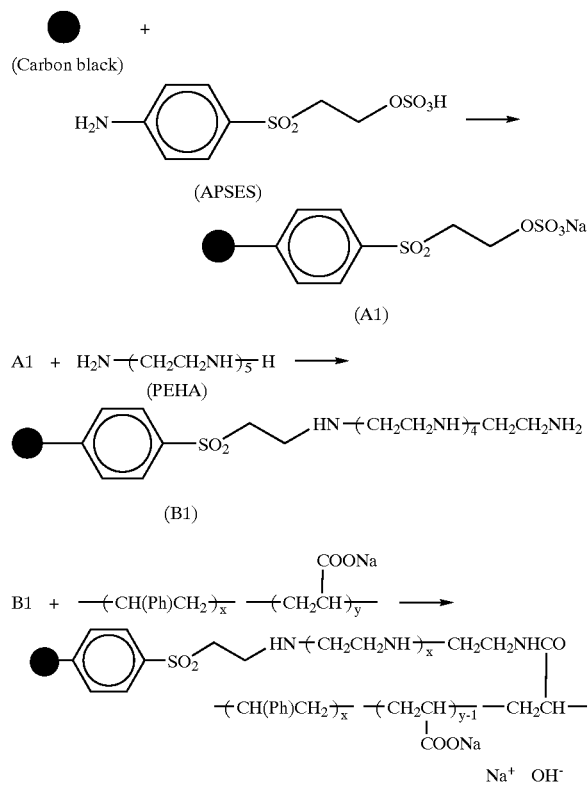

<Preparations of Pigment Dispersions 2 to 7>

Pigment dispersions 2 to 7 were prepared as described for the pigment dispersion 1, except that the copolymers listed in Table 1 shown below were used. Physical properties of thus obtained dispersions are also shown in Table 1.

<Preparation of Pigment Dispersion 8>

A dispersion A1 was prepared as described above. Then, the dispersion A1 (solid content: 15%) was reacted with a styrene-allylamine copolymer (amine value: 200, molecular weight: 10,000, polydispersity (Mw/Mn): 1.8), followed by desalting, purification for eliminating impurities, and elimination of coarse particles to give a pigment dispersion 8.

Physical properties of the pigment dispersion 8 thus obtained were: solid content: 11%, pH: 5.5, and average particle size: 120 nm. Synthesis scheme of a surface-modified pigment, the surface-modified carbon black contained in the pigment dispersion 8, is shown below.

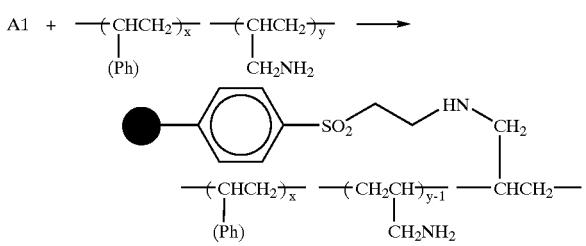

<Preparation of Pigment Dispersion 9>

A pigment dispersion 9 was prepared in the same manner as with the above pigment dispersion 8, except that a styrene-allylamine copolymer having amine value of 450, molecular weight of 4,000, and polydispersity of 1.8 was used. Physical properties of the pigment dispersion 9 thus obtained were: solid content 10%; pH4.5; and average particle size 142 nm.

<Preparation of Pigment Dispersion 10>

A pigment dispersion 10 was prepared in the same manner as with the above pigment dispersion 1, except that a styrene-acrylic copolymer having a weight average molecular weight of 5,000, an acid value of 140, and polydispersity Mw/Mn of 2.5 was used. Physical properties of the pigment dispersion 10 thus obtained were: solid content: 10.0%; pH 10; and average particle size: 130 nm.

TABLE 1

Component Substances and Physical Properties of Pigment Dispersions 2 to 7

| Pigment dispersion | Copolymer | | | | Physical property of pigment dispersion | | |
|---|---|---|---|---|---|---|---|
| | Component | Mw | Acid value | Polydispersity | Solids content (%) | pH | Average particle size (nm) |
| 2 | Styrene-acrylic resin | 10000 | 480 | 1.6 | 10.5 | 9.5 | 155 |
| 3 | Styrene-acrylic resin | 4000 | 480 | 1.8 | 11.0 | 9 | 145 |
| 4 | Styrene-acrylic resin | 8000 | 170 | 1.8 | 10.5 | 10 | 134 |
| 5 | Ethyl acrylate-acrylic resin | 3000 | 200 | 1.9 | 10.5 | 10 | 164 |
| 6 | n-butyl methacrylate acrylic resin | 10000 | 140 | 1.7 | 10.5 | 10 | 144 |
| 7 | Ethyl acrylate-styrene-acrylic resin | 7000 | 140 | 1.7 | 10.0 | 10 | 144 |

<Preparation of Pigment Dispersion 11>

A pigment dispersion 11 was prepared in the same manner as with the above pigment dispersion 1, except that a styrene-acrylic copolymer having an weight average molecular weight of 18,000, an acid value of 200, and a polydispersity Mw/Mn of 1.6 was used. Physical properties of the pigment dispersion 11 thus obtained were: solid content: 10.5%; pH10; and average particle size: 140 nm.

<Preparation of Pigment Dispersion 12>

A pigment dispersion 12 was prepared in the same manner as with the above pigment dispersion 1, except that purification for eliminating impurities was not performed but only desalting and elimination of coarse particles were performed in the final step.

Physical properties of the pigment dispersion 12 thus obtained were: solid content: 10.5%; pH9.7; and average particle size: 150 nm.

Examples 1 to 12

Inks of Examples 1 to 12 were prepared as follows: the components as shown in Tables 2-1 and 2-2 were mixed, sufficiently stirred to dissolve or disperse the components, and then the mixture was subjected to pressure filtration by using a micro filter having a pore sized of 3.0 mm (manufactured by Fuji Photo Film Co., Ltd.).

Tables 2-1 and 2-2 also show Ka values of the inks of Examples 1 to 12 determined by the Bristow method as described below. In addition, the percentage (%) of the bonded organic groups in the inks of Examples 1 to 12 was also recited. The percentage (%) of the bonded organic groups of a modified pigment was determined by using the thermogravimetric analysis described below with two significant digits.

TABLE 2-1

Compositions and Properties of Inks of Examples 1 to 6

| Component | Proportion (wt %) | | | | | |
|---|---|---|---|---|---|---|
| | Example 1 | Example 2 | Example 3 | Example 4 | Example 5 | Example 6 |
| Pigment dispersion 1 | 50 | | | | | |
| Pigment dispersion 2 | | 45 | | | | |
| Pigment dispersion 3 | | | 40 | | | |
| Pigment dispersion 4 | | | | 50 | | |
| Pigment dispersion 5 | | | | | 50 | |
| Pigment dispersion 6 | | | | | | 50 |
| Glycerine | 7 | 5 | 8 | 2 | | 7 |
| 1,5-pentanediol | 6 | | 5 | 5 | 5 | 5 |
| Trimethylolpropene | 5 | | 7 | 5 | 5 | 5 |
| Diethylune glycol | | 4 | 2 | 2 | | |
| Ethylene glycol | | 3 | 2 | | 5 | |
| Acetylene glycol EO adduct (trade name: Acetylenol EH) | 0.1 | 0.15 | | 0.1 | 0.05 | 0.1 |
| Pure water | 31.9 | 42.85 | 41 | 35.9 | 34.95 | 32.9 |
| Ka value | 0.4 | 0.4 | 0.3 | 0.5 | 0.3 | 0.6 |
| Proportion of the organic groups chemically attached to the surface modified pigment (%) | 10 | 22 | 19 | 20 | 16 | 15 |

TABLE 2-2

Compositions and Properties of Inks from Examples 7 to 12

| Component | Proportion (wt %) | | | | | |
|---|---|---|---|---|---|---|
| | Example 7 | Example 8 | Example 9 | Example 10 | Example 11 | Example 12 |
| Pigment dispersion 7 | 50 | | | | | |
| Pigment dispersion 8 | | 50 | | | | |
| Pigment dispersion 9 | | | 50 | | | |
| Pigment dispersion 10 | | | | 50 | | |
| Pigment dispersion 11 | | | | | 50 | |
| Pigment dispersion 12 | | | | | | 50 |
| Glycerine | 5 | 5 | 5 | 7 | 5 | 2 |
| 1,5-pentanediol | 5 | 5 | 5 | 6 | 5 | 5 |
| Trimethylolpropane | 3 | 5 | 6 | 5 | 7 | 5 |
| Diethylene glycol | 5 | | | | | 2 |
| Ethylene glycol | | | | | | |
| Acetylene glycol EO adduct (trade name: Acetylenol EH) | | 0.2 | 0.15 | 0.1 | 0.1 | 0.1 |
| Pure water | 32 | 34.8 | 33.85 | 31.9 | 32.9 | 35.9 |
| Ka value | 0.3 | 0.6 | 0.6 | 0.5 | 0.8 | 0.8 |

TABLE 2-2-continued

Compositions and Properties of Inks from Examples 7 to 12

| Component | Proportion (wt %) | | | | | |
| --- | --- | --- | --- | --- | --- | --- |
| | Example 7 | Example 8 | Example 9 | Example 10 | Example 11 | Example 12 |
| Proportion of the organic groups chemically attached to the surface modified pigment (%) | 19 | 15 | 17 | 8 | 30 | 20 |

Next, a specific method for determining a proportion of the organic groups chemically attached to the surface-modified pigment shown in Tables 2-1 and 2-2 is described. First, a salting out or coagulation treatment is performed on each of the inks of Examples 1 to 12. Specifically, salting out is carried out by adding an acid such as hydrochloric acid or sulfuric acid to the ink when the organic group has an anionic group, or adding an alkali such as sodium hydroxide to the ink when the organic group has a cationic group to precipitate the pigment and organic groups in the ink. Alternatively, the pigment in the ink may be precipitated by coagulation treatment of adding an excess of alcohol to the ink.

Another method for precipitating the pigment contained in the ink is, for example, a combination of salting out and coagulation or centrifugation. According to these methods, the pigment in the ink can be effectively removed The precipitate obtained by the above-described operations, which included modified carbon black as a pigment was filtered out, and the filtered solid matter was sufficiently washed with pure water, and the washed solid matter containing carbon black was dried overnight in an oven at 60° C. The resultant dried matter containing carbon black was washed with tetrahydrofuran (THF) which was a good solvent for a segment containing the above-described copolymer. This washing operation with THF was repeated three times, and subsequently, the solid matter was dried at a vacuum degree of several hundreds Pa or lower at 60° C. for 3 hours in order to volatilize the remaining water and solvent. As above, there was obtained a solid matter consisting of solely surface-modified carbon black from which free copolymer had been removed by washing with a good solvent of the copolymer.

Next, the dried matter obtained as above was used as a testing sample for TGA, and the weight loss rate of the sample in TGA was measured. From the weight loss rate, the amount of the bonded organic groups in the surface-modified carbon black was determined. In this thermogravimetric analysis, a TGA thermogravimetric apparatus, TFA851e/SDTA, manufactured by METTLER TOLEDO was used.

Figure 2:
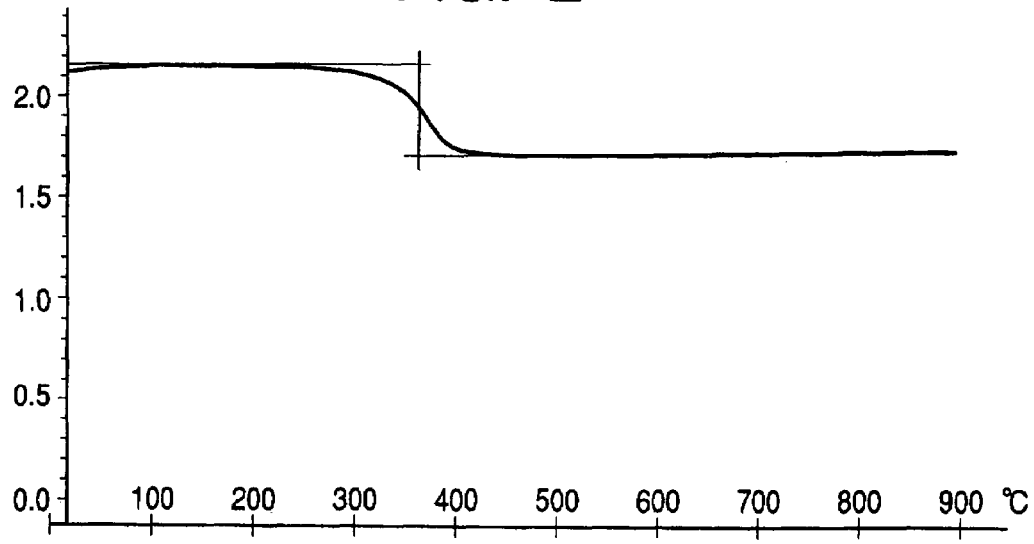
FIG. 2 is a diagram showing a result of a thermogravimetric analysis conducted on a sample prepared by coagulating and washing with THF the pigment of the pigment dispersant 4 used in Example 4.

FIG. 1 and FIG. 2 show data of weight loss rate in TGA, and these data were obtained by TGA conducted on dried samples prepared as above from the ink of Example 4 containing the pigment dispersion 4. FIG. 1 shows a result of the thermal analysis conducted on a sample dried but not washed with THF. The weight loss rate in the TGA shown in FIG. 1 represents the proportion of the sum of the bonded organic groups and the free copolymer in the surface-modified pigment. The weight loss rate was 22.87% as shown in FIG. 1.

FIG. 2 shows data obtained from the thermogravimetric analysis of a dried sample prepared by further washing with THF. That is, the weight loss rate in TGA shown in FIG. 2 represents a proportion of organic groups chemically attached to the surface-modified pigment in the surface-modified pigment, since free copolymer had been removed from this sample by washing with THF, which is a good solvent of the copolymer. This value was 19.89%.

According to the TGA data of the ink of Example 4, marked weight loss was observed at around 350° C. with both samples as shown in FIG. 1 and FIG. 2. That the weight loss was also observed in FIG. 2 means that the above-described copolymer was not lost by the washing treatment of the dried matter with a good solvent of the copolymer, when a sample for TGA was prepared. That is, it was shown that the pigment within the ink of Example 4 had an organic matter chemically bonded to the surface of the pigment particles by surface modification. From the weight loss rates in TGA shown in FIG. 1 and FIG. 2, the proportion by weight of the bonded organic groups in the total weight of the bonded organic groups and free polymers in the ink can be determined by the following equation.

$$\text{Weight proportion of the chemically attached organic groups to the total sum of the chemically attached organic groups and the free polymers} = \frac{\text{rate of decrease in weight during thermogravimetric analysis of the solid sample after washing with a good solvent}}{\text{rate of decrease in weight during thermogravimetric analysis of the solid sample formed after coagulation}} \times 100(\%)$$

The weight loss rates in the thermogravimetric analysis shown in FIG. 1 and FIG. 2 were substituted into the above equation, in order to determine a proportion of the bonded organic groups in the total weight of the bonded organic groups and free polymers in the ink of Example 4. The proportion thus calculated was (19.9/22.9)×100=86.9%.

A proportion of the bonded organic groups in the total weight of the bonded organic groups and free polymer in the ink of Example 12 was determined in the same manner as with the ink of Example 4 described above. The weight loss rate in TGA of a dried sample after coagulation was 32.0%. on the other hand, the weight loss rate in TGA of a dried sample consisting of surface-modified pigment only, obtained after washing with THF, was 20.0%. When these numerical values are substituted into the above equation, the proportion of the bonded organic groups in the total weight of the bonded organic groups and the free polymers in the ink of Example 12 was (20.0/32.0)×100 =62.5%.

Comparative Example 1

<Preparation of Pigment Dispersion 13>

10 parts of carbon black whose specific surface area was 210 g/m$^2$ and DBP oil absorption was 74 ml/100 g, 20 parts of an NaOH-neutralized 10% aqueous solution of styrene-acrylic copolymer whose acid value was 200 and weight average molecular weight was 10,000, and 70 parts of ion exchanged water were mixed and dispersed for one hour by a sand grinder. Then, the dispersion was subjected to centrifugation for removing coarse particles, and further subjected to pressure filtration using a micro filter having a pore size of 3.0 μm (manufactured by Fuji Photo Film Co., Ltd.) to obtain a pigment dispersion 13 to be used for Comparative Example 1.

Physical properties of the pigment dispersion 13 thus obtained were: solid content: 10%; pH 10.0; and average particle size: 120 nm.

<Preparation of Ink>

Components shown below were mixed with sufficient stirring to dissolve or disperse these components. Then, the mixture was subjected to pressure filtration by using a micro filter having a pore size of 3.0 μm (manufactured by Fuji Photo Film Co., Ltd.) in order to prepare an ink of Comparative Example 1.

| Ink Composition | |
| --- | --- |
| Pigment Dispersion 13 | 50 parts |
| Glycerine | 5 parts |
| Diethylene glycol | 5 parts |
| Trimethylol propane | 5 parts |
| Acetylene glycol EO adduct (Trade Name: Acetylenol EH) | 0.1 parts |
| Pure Water | 34.9 parts |

Comparative Example 2

<Preparation of Pigment Dispersion 14>

A dispersion B1 was prepared in the same manner as described with the pigment dispersion 1. Then, a pigment dispersion 14 was prepared in the same manner as described with the pigment dispersion 1, except that polyacrylic resin having a weight average molecular weight of 30,000 was used instead of styrene-acrylic resin whose weight average molecular weight was 15,000, acid value was 140, and polydispertity Mw/Mn was 1.5. Physical properties of the pigment dispersion 14 thus obtained were: solid content: 10%; pH 9.0; and average particle size: 175 nm.

<Preparation of Ink>

Components shown below were mixed with sufficient stirring to dissolve or disperse these components. Then, the mixture was subjected to pressure filtration by using a micro filter having a pore size of 3.0 μm (manufactured by Fuji Photo Film Co., Ltd.) in order to prepare an ink of Comparative Example 2.

| Ink Composition | |
| --- | --- |
| Pigment Dispersion 14 | 50 parts |
| Glycerine | 7 parts |
| Diethylene glycol | 3 parts |
| Purified Water | 40 parts |

The proportion of organic groups chemically attached to the surface modified pigment in the surface modified pigment in Comparative Examples 1 and 2 was measured in the same manner as with the above-described inks of the Examples. The result is shown in Table 3 together with the Ka values of the inks of Comparative Examples 1 and 2.

TABLE 3

| | Proportion of organic groups chemically surface attached to the modified pigment in the surface modified pigment (%) | Ka value |
| --- | --- | --- |
| Comparative Example 1 | 2.0 | 0.7 |
| Comparative Example 2 | 20 | 0.3 |

Figure 3:
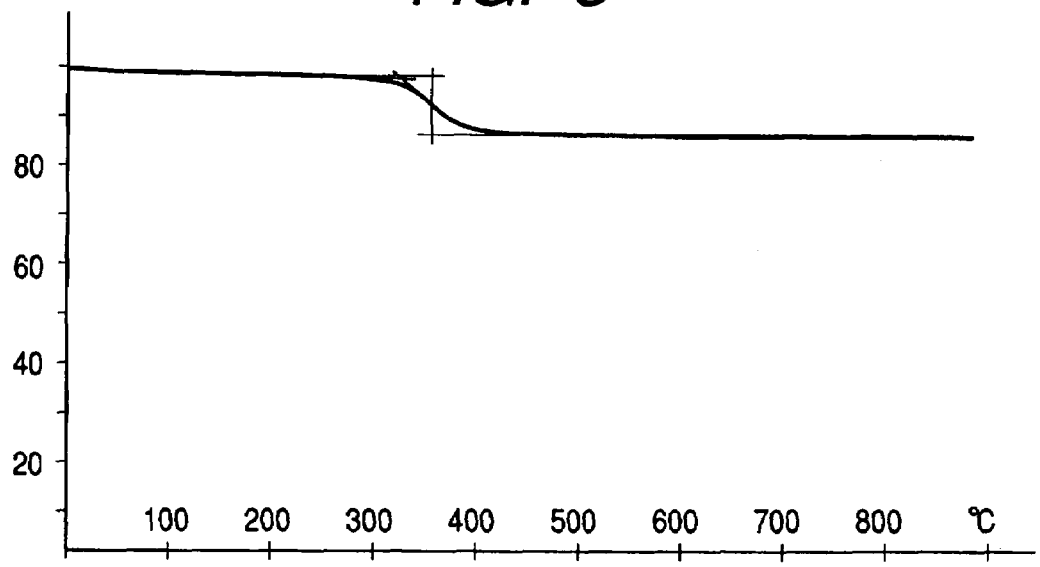
FIG. 3 is a diagram showing a result of a thermogravimetric analysis conducted on a sample of the coagulated pigment of the pigment dispersant 13 used in Comparative Example 1.
Figure 4:
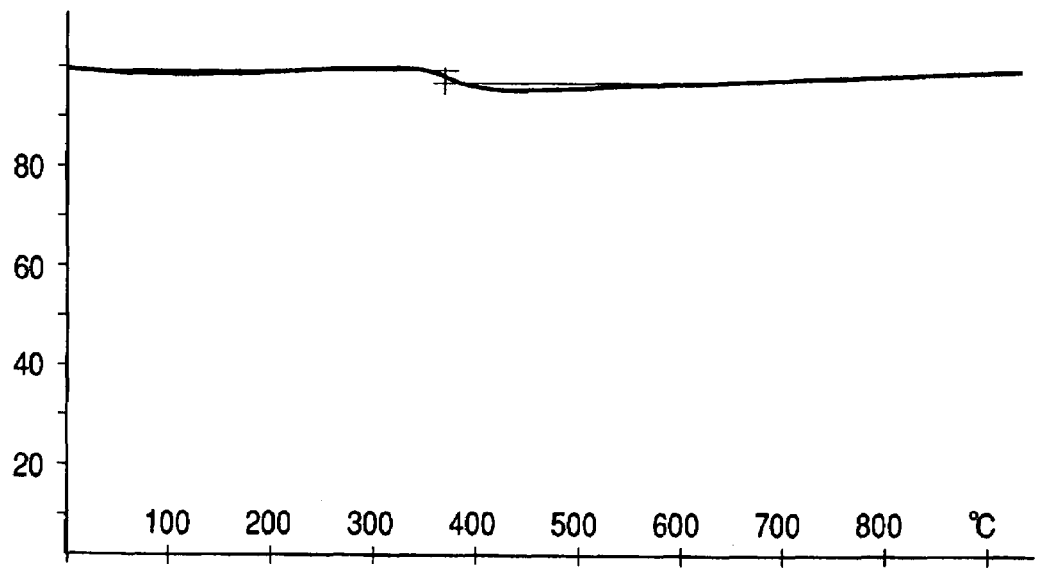
FIG. 4 is a diagram showing a result of a thermogravimetric analysis conducted on a sample prepared by coagulating and washing with THF the pigment of the pigment dispersant 13 used in Comparative Example 1.

FIG. 3 and FIG. 4 show TGA data of the dried samples prepared from the ink of Comparative Example 1. FIG. 3 shows TGA data of a sample dried after coagulation treatment. The weight loss rate in TGA shown in FIG. 3 was 13.65%. FIG. 4 shows TGA data of a sample dried after being washed with THF, which is a good solvent of the copolymer. It was found that weight loss at a temperature of about 350° C. was small in both cases. Specifically, as shown in FIG. 4, with the sample washed with THF the weight loss was hardly observed as the temperature was raised. This means that the polymer used for preparing the ink of Comparative Example 1 was lost by washing the sample with THF. That is, in the ink of Comparative Example 1, most of the copolymer was not chemically attached to the pigment, differing from the Example inks.

<Evaluations>

Evaluations of the inks obtained from the above-described Examples 1 to 12 and Comparative Examples 1, 2 were made as described below, by using a modified apparatus for ink jet recording BJF-660 (manufactured by Canon Inc.) having an on-demand type of multi recording head which discharged the ink by applying thermal energy thereto responding to recording signals. Results of the evaluation are shown in Table 4.

1. Printing Repeatability

Using the inks obtained from Examples and Comparative Examples as well as the above-described ink jet recording apparatus, solid printing (nozzle check patterns were produced at the start of the printing) was continuously performed on three sheets of A4 papers, then the printing operations were stopped for two hours, and subsequently, the solid printing was restarted and continuously performed on three sheets of papers. The above-described printing operations were repeated 10 times. Printing irregularity, and presence or absence of discharge failure of the ink were evaluated based on the following criteria.

A: printing irregularity and discharge failure of the ink are not observed.

B: printing irregularity is slightly observed but discharge failure of the ink is not observed.

C: printing irregularity and discharge failure of the ink are observed.

2. Letter Print Quality

Using the above-described inks and the above-described ink jet recording apparatus, letter printing was performed on five varieties of plain copy papers A to E shown below, then, feathering of the printed letters was evaluated based on the following criteria.

A: feathering was hardly observed in 5 varieties of papers.
B: feathering was observed a little on some papers
C: feathering was observed on 5 varieties of papers.

Copying paper used in the above-described image formation test are as follows:

A: PPC paper NSK, Canon Inc.
B: PPC paper NDK, Canon Inc.
C: PPC paper 4024, Xerox Corporation
D: PPC paper Prober Bond, Fox River Paper Company
E: PPC paper for Canon machines, Noisidora 3. Marker-Smear Resistance Using the above-described inks and the above-described ink jet recording apparatus, printing was performed on the above-described five varieties of plain papers A to E for copying, then, the images thus obtained were left for one day. Subsequently, a printed portion on each paper was marked with a commercially available water-base highlight marker pen (for example, a highlight pen OPTEXOP-100-Y, manufactured by ZEBRA Co., LTD.), and then the marked portion was inspected for smear and evaluated based on the following criteria.

A: no appreciable smears are present on all papers.
B: smears are appreciable on some papers.
C: smears are appreciable on all papers.

TABLE 4

| | Evaluation Result | | |
|---|---|---|---|
| | Printing repeatability | Print quality | Marker resistance |
| Example 1 | A | A | A |
| Example 2 | A | A | B |
| Example 3 | A | A | B |
| Example 4 | A | A | A |
| Example 5 | A | A | A |
| Example 6 | A | A | A |
| Example 7 | A | A | A |
| Example 8 | B | A | A |
| Example 9 | A | A | B |
| Example 10 | A | A | B |
| Example 11 | A | B | A |
| Example 12 | B | B | A |
| Comparative Example 1 | C | B | A |
| Comparative Example 2 | A | A | C |

Examples 13 to 17

<Preparation of Pigment Dispersion 15>

A pigment dispersion 15 was prepared in the same manner as with the pigment dispersion 1 described above, except that a styrene-acrylic resin whose weight average molecular weight was 8,000, acid value 170, and polydispersity (Mw/Mn) 1.7 was used as the copolymer.

Then, the pigment dispersion 15 and the pigment dispersion 8 were used to prepare inks of Examples 13 to 17 to have the compositions shown in the following Table 5. Table 5 shows Ka value of respective inks of Examples 13 to 17, and the proportion of bonded organic groups in the surface-modified pigment in each ink.

TABLE 5

| | Proportion | | | | |
|---|---|---|---|---|---|
| Substance | 13 | 14 | 15 | 16 | 17 |
| Pigment dispersion 15 | 50 | 50 | 50 | 50 | |
| Pigment dispersion 8 | | | | | 45 |
| Polyoxyethylene cetyl ether (HLB-16.2) | 0.3 | | | | |
| Polyoxyethylene octyl ether (HLB-15.2) | | 0.3 | | | 03 |
| Polyoxyethylene nonylphenyl ether (HLB-16) | | | 0.3 | | |
| Polyoxyethylene oxypropylene oxyethylene triethylene block copolymer (HLB-15 | | | | 1 | |
| Glycerin | 8 | 8 | 8 | 8 | 8 |
| Trimethylolpropane | 5 | 5 | 5 | 5 | 5 |
| Diethylene glycol | 5 | 5 | 5 | 5 | 5 |
| Purified water | 31.7 | 31.7 | 31.7 | 31 | 36.7 |
| Ka value | 0.8 | 0.9 | 0.8 | 0.5 | 0.8 |
| Proportion of organic groups chemically attached to the surface modified pigment (%) | 18 | 18 | 18 | 18 | 15 |

As for the printed matters printed with the inks of Examples 13 to 17, printing repeatability, letter print quality, and maker-smear resistance were evaluated in the same manner as with the evaluation of the inks of Examples 1 to 12 With respect to the letter print quality, inks of Examples 13 to 15 and 17 were evaluated as "B", and ink of Example 16 was as "A". With respect to the marker-smear resistance, all of inks of Examples 13 to 17 were evaluated as "A".

Further, the discharge stability of the inks of Examples 13 to 17 was evaluated by the following method.

Ink tanks filled with the inks of Examples 13 to 17 respectively were mounted on a modified type of an ink jet recording apparatus BJF-660 (manufactured by Canon Inc.) in turn to measure the ink discharge amount. Specifically, a certain pattern of known dot number was printed five times, then the amount of ink used for printing was divided by the dot number. A value thus obtained was used as an average discharging amount. First, solid printing starting from the nozzle check pattern was continuously performed on 10 sheets of A4 paper, then the printing operation was stopped for two hours, and then the average discharging amount was measured as described above. Next, solid printing was continuously performed on three sheets and then the average discharging amount was measured. The above-described operations were repeated 10 times to observe changes in the discharging amount. With the results thus obtained, the discharging stability was graded on the basis of the following criteria. With any ink of Examples 13 to 17, variation of discharging amounts was within a range of ±10%.

The present invention as described above, in which a pigment having a copolymer segment comprising an ionic monomer and a hydrophobic monomer being attached to a functional group on the surface of the pigment particle is used as a pigment of the aqueous ink, provides an aqueous ink in which the ribbing-smear resistance after rubbing the printing surface and the marker-smear resistance after marking with an aqueous marker are improved while some problems such as curving of discharge direction or discharge stoppage due to wetting are resolved for maintaining reliability of the ink for the recording head, particularly when this aqueous ink is used for ink jet printing. Also, the present invention provides a method for ink jet recording which uses the above-described ink, an ink cartridge, a recording unit, and an ink jet recording apparatus.

What is claimed is:

1. An aqueous ink comprising a modified pigment having an organic group chemically attached to the surface of the pigment, and an aqueous medium as a dispersant of the pigment, wherein said organic group comprises a reaction product of a functional group chemically attached to the surface of the pigment directly or via another atomic group with a copolymer of an ionic monomer and a hydrophobic monomer, wherein a proportion of the organic group contained in said modified pigment to the total amount of said modified pigment is 5 to 40 wt %;
wherein a polydispersity Mw/Mn (Mw: weight average molecular weight, Mn: number average molecular weight) of said copolymer is 3 or less.

2. The aqueous ink according to claim 1, wherein, when a segment including said copolymer which is not chemically attached to the surface of the pigment exists in said ink, a proportion of said segment to the total amount of said segment and said reaction product is less than 50 wt %.

3. The aqueous ink according to claim 2, wherein a proportion of said segment to the total amount of said segment and said reaction product is less than 35 wt %.

4. The aqueous ink according to claim 3, wherein a proportion of said segment to the total amount of said segment and said reaction product is less than 20 wt %.

5. The aqueous ink according to claim 1, wherein said other atomic group is a phenyl (2-sulfoethyl) group.

6. The aqueous ink according to claim 1, wherein said pigment is carbon black.

7. The aqueous ink according to claim 1, wherein Mw (weight average molecular weight) of said copolymer is 1,000 to 20,000, and acid value or amine value thereof is 100 to 500.

8. The aqueous ink according to claim 1, wherein the Ka value of said ink determined by Bristow method is less than 1.5 (ml/m²/msec$^{1/2}$).

9. The aqueous ink according to claim 8, wherein the Ka value is 0.2 (ml/m²/msec$^{1/2}$) to less than 1.5 (ml/m²/msec$^{1/2}$).

10. The aqueous ink according to claim 1, wherein a proportion of the organic groups contained in said modified pigment to the total amount of said modified pigment is 10 to 25 wt %.

11. The aqueous ink according to claim 1, wherein a proportion of said modified pigment to the total amount of said aqueous ink is 0.1 to 15 wt %.

12. The aqueous ink according to claim 11, wherein a proportion of said modified pigment to the total amount of said aqueous ink is 1 to 10 wt %.

13. The aqueous ink according to claim 1, further comprising a surfactant which has an alkylene oxide chain in a molecule thereof.

14. The aqueous ink according to claim 13, wherein said surfactant is a surfactant whose HLB value is 15 or more.

15. The aqueous ink according to claim 13, wherein said surfactant is at least one selected from the group consisting of compounds having Formulae (1) to (5) as described below;

$$R\text{—}O\text{—}(CH_2CH_2O)_n\text{—}H \qquad \text{Formula (1)}$$

wherein R represents an alkyl group and n represents a positive integer;

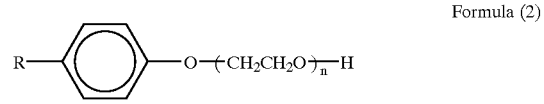

Formula (2)

wherein R represents an alkyl group and n represents a positive integer;

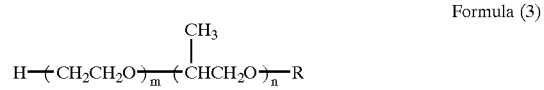

Formula (3)

wherein R represents a hydrogen atom or an alkyl group, and m and n represent positive integers independently;

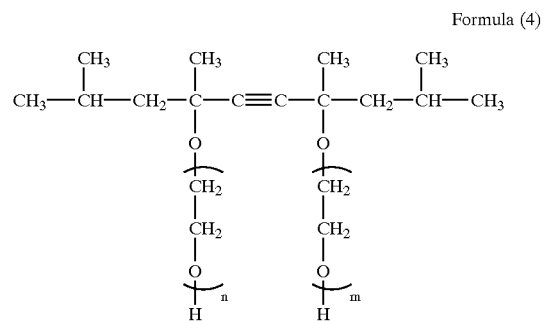

Formula (4)

wherein m and n represent positive integers independently; and

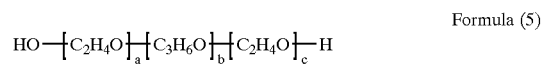

Formula (5)

wherein a, b, and c represent positive integers independently.

16. The aqueous ink according to claim 1, wherein there is no change or substantially no change between the weight loss rate in the thermogravimetric analysis of said modified pigment before and after washing with a solvent for said copolymer.

17. The aqueous ink according to claim 1, wherein said aqueous ink is used for ink jet printing.

18. A method for ink jet recording comprising a step for discharging the aqueous ink according to claim 17 by means of ink jet process.

19. A recording unit comprising an ink reservoir which contains the aqueous ink according to claim 17 and an ink jet head for discharging said ink.

20. An ink jet recording apparatus comprising an ink reservoir which contains the aqueous ink according to claim 17 and an ink jet head for discharging said ink.

21. The aqueous ink according to claim 17, wherein said copolymer has an acid value of 140 to 200.

22. An ink cartridge containing the aqueous ink according to claim 1.

23. The aqueous ink according to claim 1, wherein said copolymer has an acid value of 140 to 200.

* * * * *

UNITED STATES PATENT AND TRADEMARK OFFICE
CERTIFICATE OF CORRECTION

| | | |
|---|---|---|
| PATENT NO. | : 7,005,461 B2 | Page 1 of 3 |
| APPLICATION NO. | : 10/356471 | |
| DATED | : February 28, 2006 | |
| INVENTOR(S) | : Mikio Sanada et al. | |

It is certified that error appears in the above-identified patent and that said Letters Patent is hereby corrected as shown below:

<u>On the title page, at (30), Foreign Application Priority Data</u>:

"2002/027051" should read --2002-027051--,
"2002/191641" should read --2002-191641--, and
"2003/025615" should read --2003-025615--.

<u>On the title page, at (56), References Cited</u>:

Other Publications, "Introdcuction" should read --Introduction--.

<u>Column 3</u>:

Line 13, "hereinafter" should read --(hereinafter--.
Line 17, "after "ink.", a new paragraph --The above-described object is achieved by the present invention as described below.-- should be inserted.

<u>Column 4</u>:

Line 63, "DRAWING" should read --DRAWINGS--.

<u>Column 5</u>:

Line 46, "arc" should read --are--.

<u>Column 10</u>:

Line 5, "limited" should read --intend--.

<u>Column 13</u>:

Line 26, "follows" should read --follows.--.
Line 50, "arc" should read --are--.

<u>Column 16</u>:

Line 24, "analysis" should read --analysis--.

UNITED STATES PATENT AND TRADEMARK OFFICE
CERTIFICATE OF CORRECTION

| | |
|---|---|
| PATENT NO. | : 7,005,461 B2 |
| APPLICATION NO. | : 10/356471 |
| DATED | : February 28, 2006 |
| INVENTOR(S) | : Mikio Sanada et al. |

It is certified that error appears in the above-identified patent and that said Letters Patent is hereby corrected as shown below:

Column 17:

Line 34, after "methods." the paragraph ---Recording Method, Recording Unit, Cartridge, and Recording Apparatus-- should be inserted.
Line 51, "high-meting" should read --high-melting--.
Line 56, "applied" should read --applied to--.
Line 60, "a heat" should read --heat--.
Line 66, "multi-head" should read --a multi-head--.

Column 19:

Line 3, "isequipped" should read --is equipped--.

Column 20:

Line 7, "riot" should read --not--.

Column 21:

Line 29, "$(CH_2CH_2NH)_x$" should read --$(CH_2CH_2NH)_4$--.

Column 24:

Line 7, "sized" should read --size--.
Line 39, "10" should read --18--.

Column 25:

Line 33, "removed" should read --removed.--.

Column 27:

Line 9, "on" should read --On--.
Line 67, "polydispertity" should read --polydispersity--.

Column 28:

Line 29, "surface attached to the" should read --attached to the surface--.

UNITED STATES PATENT AND TRADEMARK OFFICE
CERTIFICATE OF CORRECTION

PATENT NO. : 7,005,461 B2
APPLICATION NO. : 10/356471
DATED : February 28, 2006
INVENTOR(S) : Mikio Sanada et al.

It is certified that error appears in the above-identified patent and that said Letters Patent is hereby corrected as shown below:

Column 29:

Line 21, "some papers" should read --some papers.--.

Column 30:

Line 24, "03" should read --0.3--.
Line 32, "(HLB-15" should read --(HLB 15)--.
Line 44, "maker-smear" should read --marker-smear--.
Line 46, "12" should read --12--.

Column 31:

Line 55, "Bristow" should read --the Bristow--.

Column 32:

Line 12, "below;" should read --below:--.

Column 33:

Line 3, "ink" should read --an ink--.

Signed and Sealed this

Thirtieth Day of January, 2007

JON W. DUDAS
*Director of the United States Patent and Trademark Office*